US012335274B2

(12) United States Patent
Bloomquist et al.

(10) Patent No.: US 12,335,274 B2
(45) Date of Patent: *Jun. 17, 2025

(54) MANAGING VERIFICATION REPOSITORIES TO FACILITATE REAL-TIME SERVICING OF VERIFICATION QUERIES

(71) Applicant: EQUIFAX INC., Atlanta, GA (US)

(72) Inventors: Eric Bloomquist, St. Louis, MO (US); Chad Whittenberg, St. Louis, MO (US); Martin Bertolino, Chesterfield, MO (US)

(73) Assignee: Equifax Inc., Atlanta, GA (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/813,408

(22) Filed: Jul. 19, 2022

(65) Prior Publication Data

US 2022/0353274 A1  Nov. 3, 2022

Related U.S. Application Data

(63) Continuation of application No. 16/607,715, filed as application No. PCT/US2017/030196 on Apr. 28, 2017, now Pat. No. 11,431,729.

(51) Int. Cl.
*H04L 9/40* (2022.01)
*G06F 21/62* (2013.01)

(52) U.S. Cl.
CPC ........ *H04L 63/126* (2013.01); *G06F 21/6245* (2013.01); *H04L 63/083* (2013.01); *H04L 63/102* (2013.01)

(58) Field of Classification Search
CPC ........ G06F 21/31; G06F 21/335; G06F 21/62; G06F 21/6245; G06Q 20/3821;
(Continued)

(56) References Cited

U.S. PATENT DOCUMENTS 8,086,525 B2 * 12/2011 Atwood ................. G06Q 20/10
705/38
8,612,758 B2   12/2013 Sestili
(Continued)

OTHER PUBLICATIONS

CA3,062,775, "Office Action", Apr. 5, 2023, 4 pages.
(Continued)

*Primary Examiner* — Harris C Wang
(74) *Attorney, Agent, or Firm* — Kilpatrick Townsend & Stockton LLP

(57) ABSTRACT

In some aspects, a verification exchange system transforms consumer data (e.g., employment or income data) from different contributor computing systems to a standardized format and stores this standardized data in a consumer-status verification repository. The verification exchange system can selectively provide portions of the consumer data to authorized client system via a security portal to a public network. For example, the verification exchange system can use standardized consumer data to service verification queries requesting confirmation of employment or income level for consumers. The verification exchange system can do so by ensuring that a verifier system from which the query is received has provided a valid credential. In another example, the verification exchange system can restrict access to the standardized consumer data to accessors that are (i) an originating contributor computing system for the employment or income data or (ii) consumers described by the standardized employment or income data.

20 Claims, 8 Drawing Sheets

(58) Field of Classification Search
CPC ............. G06Q 20/389; G06Q 20/4016; G06Q 20/425; H04L 63/083; H04L 63/102; H04L 63/126; H04L 67/02; H04L 67/06; H04L 67/2823; H04L 67/306
See application file for complete search history.

(56) References Cited

U.S. PATENT DOCUMENTS

| | | | |
|---|---|---|---|
| 9,313,179 | B1 | 4/2016 | Yung et al. |
| 9,577,986 | B1 | 2/2017 | Dooley |
| 9,679,254 | B1* | 6/2017 | Mawji ............... G06F 16/24578 |
| 10,462,080 | B1* | 10/2019 | Jones ................... H04L 67/306 |
| 11,431,729 | B2 | 8/2022 | Bloomquist et al. |
| 2002/0120846 | A1* | 8/2002 | Stewart ............... G06Q 20/401 713/168 |
| 2003/0069839 | A1* | 4/2003 | Whittington ........... G06Q 40/03 705/38 |
| 2012/0176229 | A1 | 7/2012 | Fischer et al. |
| 2013/0346752 | A1 | 12/2013 | Mercer |
| 2015/0178332 | A1* | 6/2015 | Said ..................... G06F 16/215 707/754 |
| 2016/0086263 | A1* | 3/2016 | Weinflash .............. G06Q 40/03 705/38 |
| 2016/0321610 | A1* | 11/2016 | Stein .................. G06Q 20/4014 |
| 2020/0137080 | A1* | 4/2020 | Bloomquist ....... G06Q 20/3821 |

OTHER PUBLICATIONS

EP17908014.8, "Intention to Grant", Jan. 30, 2023, 9 pages.
EP17908014.8, "Intention to Grant", Jul. 12, 2023, 8 pages.
EP23173770.1, "Extended European Search Report", Aug. 7, 2023, 11 pages.
Australian No. AU2022224756, "Second Examination Report", Mar. 21, 2024, 3 pages.
Australian Application No. AU2022224756, "Notice of Acceptance", mailed Aug. 28, 2024, 3 pages.
"Income and Employment Verifications", Verification Exchange—A New Solution from Equifax (16-5105), 2017, 2 pages.
"Record of Employment (ROE) Management: A New Service from Equifax", Workforce Solutions (16-2727), Equifax, 2017, 1 page.
"Verification Exchange: Equifax Employment and Income Verification in Canada", Frequently Asked Questions (16-5102), Equifax, 2017, 2 pages.
U.S. Appl. No. 16/607,715, "Corrected Notice of Allowability", May 19, 2022, 2 pages.
U.S. Appl. No. 16/607,715, "Non-Final Office Action", Dec. 7, 2021, 14 pages.
U.S. Appl. No. 16/607,715, "Notice of Allowance", Apr. 20, 2022, 10 pages.
Australian Patent Application No. 2017410919, "First Examination Report", Jan. 21, 2022, 4 pages.
Australian Patent Application No. 2017410919, "Notice of Acceptance", May 18, 2022, 3 pages.
European Patent Application No. 17908014.8, "Extended European Search Report", Oct. 14, 2020, 9 pages.
International Patent Application No. PCT/US2017/030196, "International Preliminary Report on Patentability", Nov. 7, 2019, 11 pages.
International Patent Application No. PCT/US2017/030196, "International Search Report and Written Opinion", Jan. 23, 2018, 14 pages.

* cited by examiner

MANAGING VERIFICATION REPOSITORIES TO FACILITATE REAL-TIME SERVICING OF VERIFICATION QUERIES

CROSS-REFERENCES TO RELATED APPLICATIONS

This application is a continuation of U.S. patent application Ser. No. 16/607,715, filed on Oct. 23, 2019, entitled MANAGING VERIFICATION REPOSITORIES TO FACILITATE REAL-TIME SERVICING OF VERIFICATION QUERIES, which is a 371 U.S. national stage entry of PCT/US2017/030196, filed Apr. 28, 2017, entitled MANAGING VERIFICATION REPOSITORIES TO FACILITATE REAL-TIME SERVICING OF VERIFICATION QUERIES, all of which are hereby incorporated by reference herein in their entirety.

TECHNICAL FIELD

This disclosure relates generally to computer-implemented methods and systems for managing content and access to sensitive data stored in electronically accessible data structures, and more particularly relates to managing verification repositories associated with consumer entities and thereby facilitating real-time servicing of queries from remote, third-party computing systems involving the verification of one or more consumer attributes.

BACKGROUND

Various types of sensitive data, such as consumer records, are often stored in databases and other types of data repositories for access via data networks. Virtually any type of information may be contained in any such database. For example, an online service allows different computing systems, which are located from one another, to be used for conducting electronic transactions that require sensitive data for completion.

The sensitive data stored in an online data repository can change frequently. For example, data describing various attributes of an individual may rapidly become inaccurate due to changes in that individual's circumstances (e.g., income level, employment, address, etc.). Maintaining the accuracy of data describing these changes can be hindered by access control requirements. For instance, online access to certain types of data may be strictly controlled due to the sensitive the data, which increases the effort required to maintain a repository of accurate, sensitive data. If online services rely on the accuracy of this data, these inaccuracies hinder the prompt completion of electronic transactions between computing systems, which results in sub-optimal allocation of resources. This misallocation can include, for example, wasted computing resources for incomplete transactions, lost opportunity for consumers and businesses, delays in providing access to certain online features, etc.

SUMMARY

Various embodiments of this disclosure provide systems and methods for updating verification repository data structures to facilitate real-time servicing of verification queries. In one example, a verification exchange system transforms employment or income data from different contributor computing systems (e.g., employers, payroll systems, human-resource systems, etc.) to a standardized format and stores this standardized data in a consumer-status verification repository. The verification exchange system obtains the employment or income data from contributor systems via a security portal to a public network. The verification exchange system selectively provides portions of the employment or income data to authorized client system via the security portal to a public network. For example, the verification exchange system can use standardized employment or income data to service verification queries requesting confirmation of employment or income level for consumers. The verification exchange system does so by ensuring that a verifier system from which the query is received has provided a valid credential. In another example, the verification exchange system can restrict access to the standardized employment or income data to accessors that are (i) an originating contributor computing system for the employment or income data or (ii) consumers described by the standardized employment or income data.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

Features, aspects, and advantages of this disclosure are better understood when the following Detailed Description is read with reference to the accompanying drawings.

DETAILED DESCRIPTION

Figure 1:
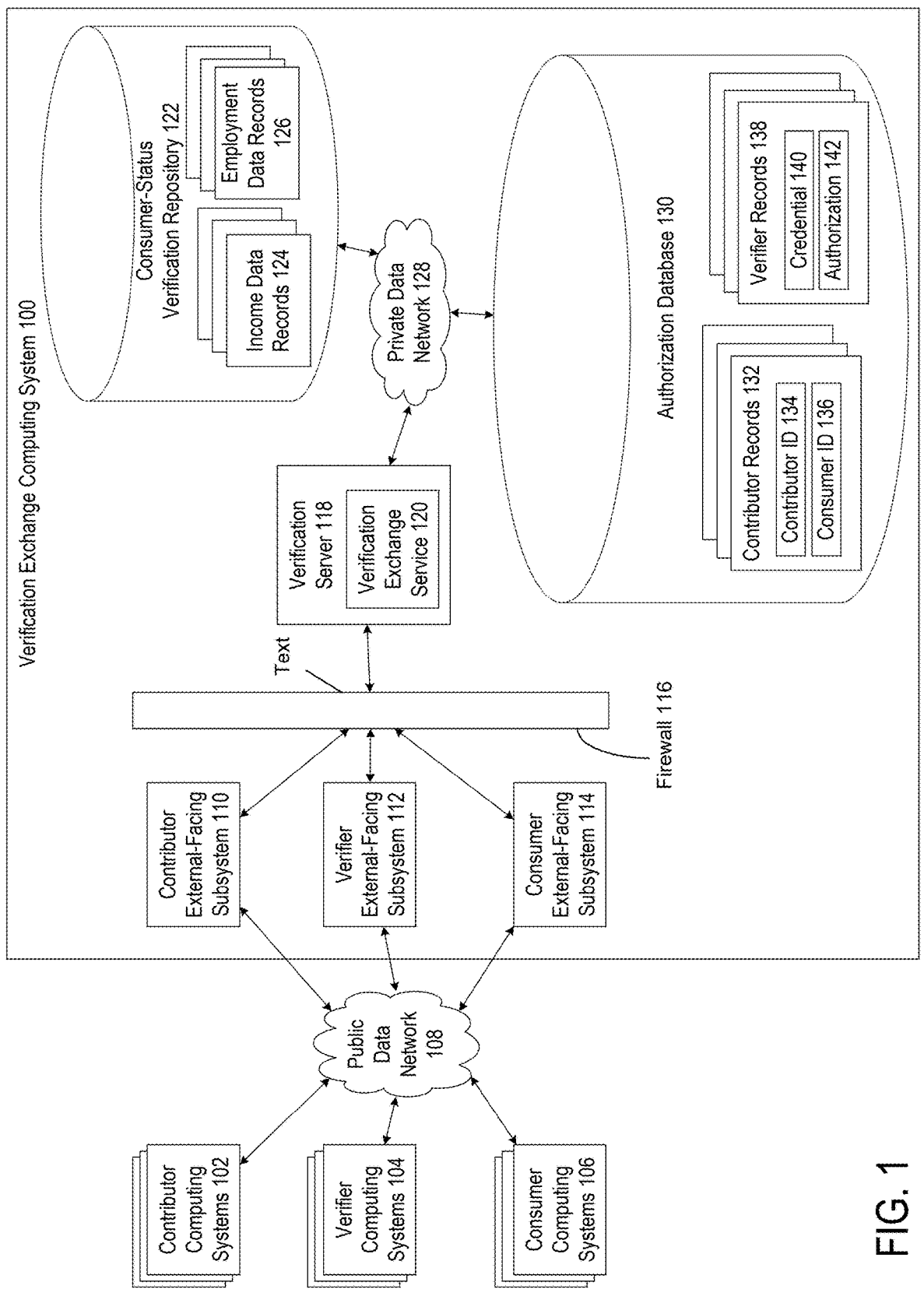
FIG. 1 is a block diagram depicting an example of an operating environment in which a verification exchange service manages a verification repository and services verification queries from the verification repository, according to certain aspects of this disclosure.

Certain aspects and features of this disclosure involve facilitating real-time servicing of verification queries from a verification repository while maintaining required access control procedures for the sensitive data used for responding to these queries. For example, a verification exchange computing system can provide contributors of sensitive data (e.g., computing systems operated by employers, human resource systems, insurance companies, etc.) with controlled access via a public data network to a consumer-status verification repository. The verification exchange computing system establishes secure communication channels with these contributor systems, which allows the verification exchange computing system to receive regular updates to sensitive data generated by the contributor systems. The verification exchange computing system can also standardize sensitive data that is received in disparate formats from different contributor systems. For example, the verification exchange computing system can automatically detect different data formats used by various contributors and generate executable code for transforming a given contributor's dataset into a standardized format used by the verification repository. This standardization process facilitates faster searching and more accurate responses when servicing verification queries. The verification exchange computing system can service, in real time, these verification queries from third-party systems. Examples of verification queries include requests by vendor systems and other verifier systems to verify one or more characteristics of a consumer involved in a transaction. The verification exchange computing system can implement a search match feature to locate and identify a consumer that matches a given set of verification query parameters, thereby enhancing match rates. Servicing these queries in real time can facilitate prompt completion of electronic transactions between these third-party systems and consumer systems.

In some aspects, the verification exchange computing system can provide a single point-of-interface for different computing systems that restricts access to the sensitive data in a manner that is customized for different types of accessors. Examples of accessors include contributor systems, consumer system, and verifier systems. For instance, the verification exchange computing system can track the source of sensitive data and provide a particular contributor system (e.g., an employer system that provided the data) with online access to any sensitive data (e.g., income or employment data) that originated from that contributor system. In another example, the verification exchange computing system can determine the identity of certain consumers described by the sensitive data, such as an employee whose income and verification data has been provided). The verification exchange computing system can provide that a certain consumer with access to any sensitive data that describes that consumer. In another example, the verification exchange computing system can ensure that verifier systems, which submit verification queries for the sensitive data, are compliant with any relevant data-access protocols governing the sensitive data before the verification exchange computing system services the verification queries.

In some aspects, the verification exchange computing system's role as a common point-of-interface to a verification repository facilitates real-time completion of electronic transactions while maintaining data security. For example, the verification exchange computing system can use various external facing subsystems to interface with different types of third-party systems (e.g., contributors, consumers, verifiers) and thereby enforce access permissions that are specific to the type of third-party system. Providing this secure point-of-interface facilitates regular updates to the verification repository from multiple contributor systems as well as standardization of the sensitive data received from the different contributor systems. Thus, the verification repository can be a secure source of accurate data about consumers, thereby increasing the efficiency with which online transactions are completed between consumer systems and verifier systems.

These illustrative examples are given to introduce the reader to the general subject matter discussed here and are not intended to limit the scope of the disclosed concepts. The following sections describe various features and examples with reference to the drawings, in which like numerals indicate like elements, but, like the illustrative examples, should not be used to limit this disclosure.

Operating Environment Example for Verification Exchange Service

Referring now to the drawings, FIG. 1 is a block diagram depicting an example of an operating environment in which a verification exchange service 120 manages a consumer-status verification repository 122 and uses the consumer-status verification repository 122 to service verification queries from verifier computing systems 104. FIG. 1 depicts examples of hardware components of a verification exchange computing system 100, according to some aspects. The verification exchange computing system 100 is a specialized computing system that may be used for processing large amounts of data using a large number of computer processing cycles.

The numbers of devices depicted in FIG. 1 are provided for illustrative purposes. Different numbers of devices may be used. For example, while certain devices or systems are shown as single devices in FIG. 1, multiple devices may instead be used to implement these devices or systems.

The verification exchange computing system 100 can communicate with one or more client systems. Client systems can include contributor computing systems 102, verifier computing systems 104, consumer computing systems 106, or some combination thereof. For example, client systems may send data to the verification server 118 to be processed or may send signals to the verification server 118 that control or otherwise influence different aspects of the verification exchange computing system 100 or the data it is processing. The client systems may interact, via one or more public data networks 108, with various external-facing subsystems of the verification exchange computing system 100 (e.g., a contributor external-facing subsystem 110, a verifier external-facing subsystem 112, and a consumer external-facing subsystem 114). Each external-facing subsystem includes one or more computing devices that provide a physical or logical subnetwork (sometimes referred to as a "demilitarized zone" or a "perimeter network") that expose certain online functions of the verification exchange computing system 100 to an untrusted network, such as the Internet or another public data network 108. Each external-facing subsystem is communicatively coupled, via a firewall device 116, to one or more computing devices forming a private data network 128. The firewall device 116, which can include one or more devices, creates a secured part of the verification exchange computing system 100 that includes various devices in communication via the private data network 128. In some aspects, by using the private data network 128, the verification exchange computing system 100 can house the consumer-status verification repository 122 in an isolated network (i.e., the private data network 128) that has no direct accessibility via the Internet or another public data network 108. The client systems may also interact with one another via one or more public data networks 108 to facilitate electronic transactions between users of the consumer computing systems 106 and online services provided by the verifier computing systems 104.

Each contributor computing system 102 may include one or more third-party devices (e.g., computing devices or groups of computing devices), such as individual servers or groups of servers operating in a distributed manner. A contributor computing system 102 can include any computing device or group of computing devices operated by an employer, a payroll system, a human-resource management system, an insurance provider system, a healthcare provider system, a government data-provider system, etc. The contributor computing system 102 can include one or more server devices. The one or more server devices can include or can otherwise access one or more non-transitory computer-readable media. The contributor computing system 102 can also execute an online service. The online service can include executable instructions stored in one or more non-transitory computer-readable media. The contributor computing system 102 can further include one or more processing devices that are capable of storing, formatting, and transmitting income data, employment data, or both to a verification exchange computing system 100.

Each verifier computing system 104 may include one or more third-party devices, such as individual servers or groups of servers operating in a distributed manner. A verifier computing system 104 can include any computing device or group of computing devices operated by a seller, lender, or other provider of products or services. The verifier computing system 104 can include one or more server devices. The one or more server devices can include or can otherwise access one or more non-transitory computer-readable media. The verifier computing system 104 can also execute an online service. The online service can include executable instructions stored in one or more non-transitory computer-readable media. The verifier computing system 104 can further include one or more processing devices that are capable of executing the online service to perform operations described herein. In some aspects, the online service can provide an interface (e.g., a website, web server, or other server) to facilitate electronic transaction involving a user of a consumer computing system 106. The online service may transmit data to and receive data from the consumer computing system 106 to enable a transaction.

Each communication within the verification exchange computing system 100 (e.g., between contributor computing systems 102 and the verification exchange computing system 100, between consumer computing systems 106 and the verifier computing systems 104, between verifier computing systems 104 and the verification exchange computing system 100, etc.) may occur over one or more data networks, such as a public data network 108, a private data network 128, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data network.

A data network may include network computers, sensors, databases, or other devices that may transmit or otherwise provide data to verification exchange computing system 100. For example, a data network may include local area network devices, such as routers, hubs, switches, or other computer networking devices. The data networks depicted in FIG. 1 can be incorporated entirely within (or can include) an intranet, an extranet, or a combination thereof. In one example, communications between two or more systems or devices can be achieved by a secure communications protocol, such as secure Hypertext Transfer Protocol ("HTTPS") communications that use secure sockets layer ("SSL") or transport layer security ("TLS"). In addition, data or transactional details communicated among the various computing devices may be encrypted. For example, data may be encrypted in transit and at rest.

The verification exchange computing system 100 can include one or more verification servers 118. The verification server 118 may be a specialized computer or other machine that processes the data received within the verification exchange computing system 100. The verification server 118 may include one or more other systems. For example, the verification server 118 may include a database system for accessing the network-attached storage unit, a communications grid, or both. A communications grid may be a grid-based computing system for processing large amounts of data.

In some aspects, the verification server 118 can allow the verification exchange computing system 100 to be an interface between various contributor computing systems and various verifier computing systems 104. This architecture can facilitate the real-time provision of income or employment information, which is received from the contributor computing systems 102, to verifier computing systems 104 that engage in electronic transactions with consumer computing systems 106. This provision of information facilitates completion of electronic transactions in real time (e.g., during an electronic transaction between the verifier computing system 104 and a consumer computing system 106). The verification exchange computing system 100 can communicate with the client systems in a manner that is out of band with respect to the contributor computing systems 102, the verifier computing systems 104, the consumer computing systems 106, or both. For example, the communications between the verification exchange computing system 100 and a contributor computing system 102 can be performed via a separate communication channel, session, or both as compared to the communication channel or session established between the verification exchange computing system 100 and a verifier computing system 104.

For example, the verification server 118 can include one or more processing devices that execute program code, such as a verification exchange service 120. The program code is stored on a non-transitory computer-readable medium. The verification exchange service 120 can execute one or more processes for standardizing disparate sets of employment and income verification data received from contributor computing systems 102. The standardized employment and income verification data can be stored in a consumer-status verification repository 122 as a set of income data records 124 and employment data records 126. The verification exchange service 120 can also execute one or more processes that facilitate electronic transactions between consumer computing systems 106 and verifier computing systems 104 by, for example, servicing income or employment verification queries received from the verifier computing systems 104 in real time. The income data records 124 and employment data records 126 are structured in a format that facilitates retrieval of large subsets of the income data records 124 and employment data records 126 during thousands or millions of sessions among the verifier computing systems 104 and the consumer computing systems 106.

In some aspects, the verification exchange service 120 can include one or more modules, such as a web server module, a web services module, or an enterprise services module, which individually or in combination facilitate electronic transactions. For example, a web server module can be executed by a suitable processing device to provide one or more web pages or other interfaces to a contributor computing system 102, a verifier computing system 104, or a consumer computing system 106. The web pages or other interfaces can include content provided by the web services module. The web services module can generate this content by executing one or more algorithms using information retrieved from one or more of the income data records 124, the employment data records 126, or both. The enterprise services module can be executed to retrieve the information from one or more of the income data records 124, the employment data records 126, or both.

The verification exchange computing system 100 may also include one or more network-attached storage units on which various repositories, databases, or other structures are stored. Examples of these data structures are the consumer-status verification repository 122 and the authorization database 130. Network-attached storage unit may store a variety of different types of data organized in a variety of different ways and from a variety of different sources. For example, the network-attached storage unit may include storage other than primary storage located within verification server 118 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The consumer-status verification repository 122 can store income data records 124 and the employment data records 126. The income data records 124, the employment data records 126, or both can be received by a verification server 118 via a data network, generated by the verification server 118 based on communications with client computing systems, or some combination thereof. The income data records 124, the employment data records 126, or both can be stored in, for example, a database or other suitable data source. Suitable data sources can include, for example, secure and credentialed databases or other data structures managed by or otherwise accessible by the verification exchange service 120.

The income data records 124, the employment data records 126, or both can include consumer identification data. Consumer identification data can include any information that can be used to uniquely identify an individual or other entity. In some aspects, consumer identification data can include information that can be used on its own to identify an individual or entity. Non-limiting examples of such consumer identification data include one or more of a legal name, a company name, a social insurance number, a credit card number, a date of birth, an e-mail address, etc. In other aspects, consumer identification data can include information that can be used in combination with other information to identify an individual or entity. Non-limiting examples of such consumer identification data include a street address or other geographical location, employment data, etc.

The authorization database 130 can store contributor records 132 (e.g., employer records, tax data, etc.) and verifier records 138. The contributor records 132, verifier records 138, or both can be received by a verification server 118 via a data network, generated by the verification server 118 based on communications with client computing systems, or some combination thereof.

In some aspects, the contributor records 132 include contributor identifiers 134 and consumer identifiers 136. The contributor identifiers 134 and consumer identifiers 136 can be used to restrict access to data stored in the consumer-status verification repository 122. For example, a contributor identifier 134, in combination with a password or other credentials, can be used to authenticate a particular contributor computing system 102. The contributor identifier 134, in combination with a password or other credentials, can be used to restrict access to certain income data records 124, employment data records 126, or both such that an originating contributor computing system 102 (e.g., the employer computing system that provided the data from which those income data records 124 and employment data records were generated) can access these income data records 124, employment data records 126, or both, even though other contributor computing systems 102 cannot do so. A consumer identifier 136, in combination with a password or other credentials, such as a combination of a consumer identifier 136 and a corresponding contributor identifier 134, can be used to authenticate a particular consumer computing system 106 and to provide the consumer computing system 106 with access to certain income data records 124, employment data records 126, or both that describe a particular consumer associated with the consumer computing system 106. One example of a consumer identifier 136 is a government-issued identification number (e.g., a driver's license number, a social insurance number, etc.) that is obtained by the verification exchange service 120 from one or more employment data records 126. Another example of a consumer identifier 136 is an auto-generated, unique identifier assigned by the contributor or the verification service to a particular consumer.

The verifier records 138 can include authorization credentials 140 and authorizations 142. Each authorization credential 140 can include information that can be used to uniquely identify a requesting verifier computing system 104 from which a verification query is received or the entity associated with the verifier computing system 104. Each authorization 142 can include information that identifies certain verification operations that can be performed on behalf of a verifier by the verification exchange computing system 100. For example, an authorization 142 can indicate whether a verifier has suitable qualifications to handle sensitive consumer data in accordance with legal or regulatory requirements, whether a verifier computing system 104 implements suitable security protocols for enforcing compliance with legal or regulatory requirements, etc.

A consumer computing system 106 can include any computing device or other communication device operated by a consumer, a buyer, or other user. The consumer computing system 106 can include one or more consumer computing systems 106. A consumer computing system 106 can include executable instructions stored in one or more non-transitory computer-readable media. The consumer computing system 106 can also include one or more processing devices that are capable of executing the consumer computing system 106 to perform operations described herein. In some aspects, the consumer computing system 106 can allow a user to engage in mobile commerce with a verifier computing system 104. For instance, the user or other entity accessing the consumer computing system 106 can use the consumer computing system 106 to engage in an electronic transaction with a verifier computing system 104 via an online service.

In some aspects, the verification exchange computing system 100 can implement one or more procedures to secure communications between the verification exchange computing system 100 and other client systems. Non-limiting examples of features provided to protect data and transmissions between the verification exchange computing system 100 and other client systems include secure web pages, encryption, firewall protection, network behavior analysis, intrusion detection, etc. In some aspects, transmissions with client systems can be encrypted using public key cryptography algorithms using a minimum key size of 128 bits. In additional or alternative aspects, website pages or other data can be delivered through HTTPS, secure file-transfer protocol ("SFTP"), or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

Figure 2:
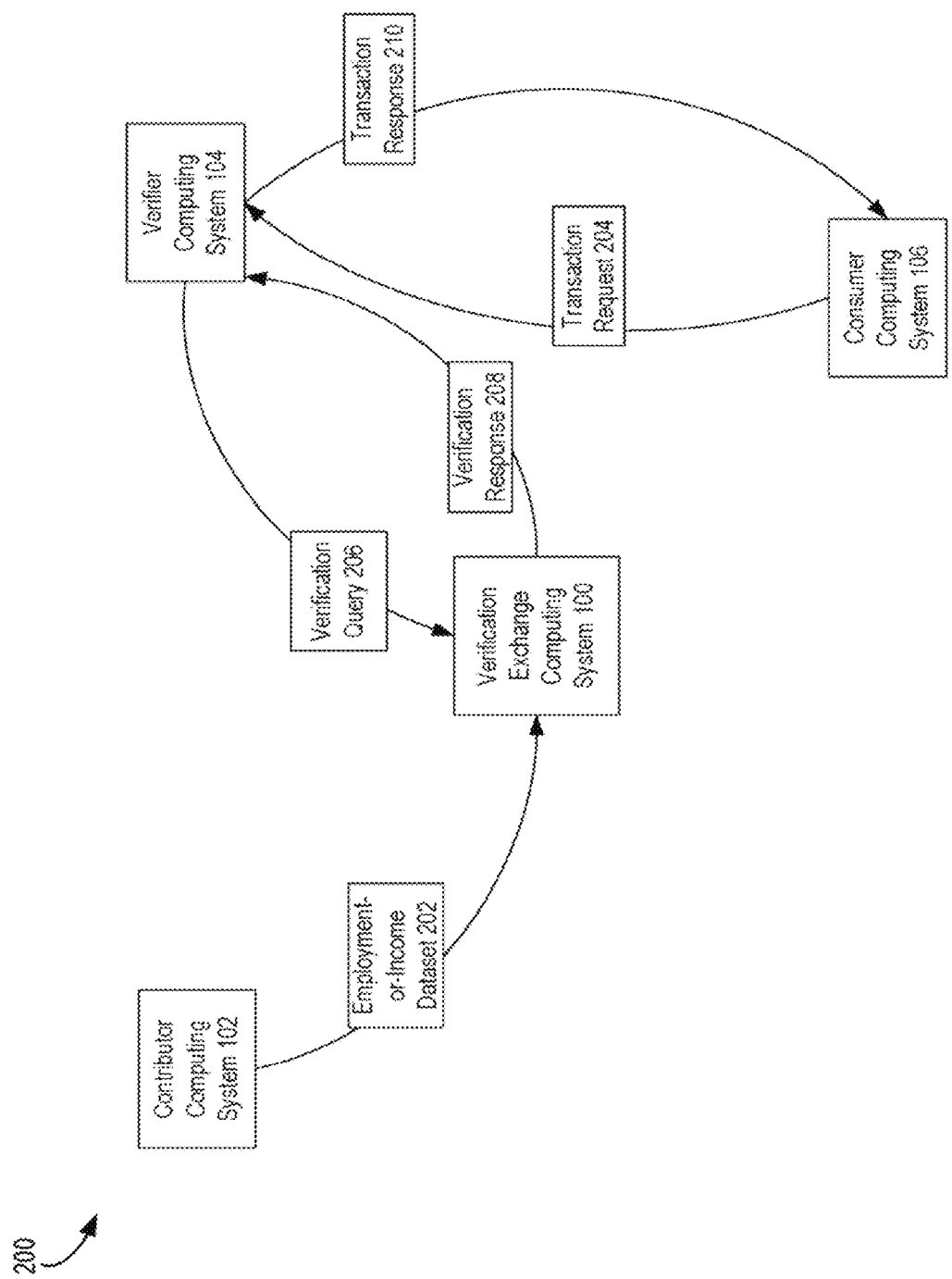
FIG. 2 is a data flow diagram depicting an example of a data flow for using the verification exchange computing system of FIG. 1 to update the verification repository and service verification queries, according to certain aspects of this disclosure.

Examples of Communication Flows Among the Verification Exchange Computing System and Client Systems FIG. 2 is a data flow diagram depicting an example of a data flow 200 for using the verification exchange computing system 100 to update the consumer-status verification repository 122 and to service verification queries. The data flow can involve one or more of the computing devices depicted in FIG. 1 and can include any examples of processes described herein, but other implementations are possible.

In the data flow 200, a contributor computing system 102 can generate an employment-or-income dataset 202. The employment-or-income dataset 202 can include one or more data objects with data describing multiple consumers (e.g., employees of an employer that uses the contributor computing system 102). The data describing multiple consumers can include employment data, income data, or some combination thereof. A data object in an employment-or-income dataset 202 includes a set of data entries that are addressable via suitable identifiers (e.g., an employee name, an employee identifier, a government-issued identification number, etc.). Examples of data objects include JavaScript Object Notation ("JSON") files, relational databases, individual tables, etc.

The contributor computing system 102 can transmit an employment-or-income dataset 202 to the verification exchange computing system 100. For instance, the contributor computing system 102 and the contributor external-facing subsystem 110 can establish a secure communication channel, such as an SFTP connection, via the public data network 108. The contributor computing system 102 can encrypt the employment-or-income dataset 202 and transmit the employment-or-income dataset 202 via the secure communication channel. The contributor external-facing subsystem 110 can transmit the received employment-or-income dataset 202 to the verification server 118 via a firewall device 116. The verification server 118 can update the consumer-status verification repository 122 by integrating the received employment-or-income dataset 202 with the employment and income data stored in the consumer-status verification repository 122. Examples of updating the consumer-status verification repository 122 are described herein with respect to FIGS. 6 and 7. The verification exchange computing system 100 can use the consumer-status verification repository 122 to service verification queries received from verifier computing systems 104.

For instance, a consumer computing system 106 can be used to establish a session with an online service provided by the verifier computing system 104. The session can be used to perform electronic transactions between the consumer computing system 106 and the verifier computing system 104 over a public data network 108. During the session, the consumer computing system 106 can transmit a transaction request 204 to the verifier computing system 104. The transaction request 204 can include a request for an online service, which is provided by the verifier computing system 104, to perform electronic operations on behalf of a user of the consumer computing system 106. These electronic operations can be restricted to require certain attributes of the user (e.g., an income level, an employment status, etc.). The transaction request 204 can include a consent message authorizing the verifier computing system 104 to verify that the user has these attributes.

The verifier computing system 104 can verify that the user has these attributes via communications with the verification exchange computing system 100. These verification operations can occur in real time. For example, during a session between the verifier computing system 104 and the consumer computing system 106, the verifier computing system 104 can transmit a verification query 206 to the verification exchange computing system 100 and receive a verification response 208, which can include a confirmation of one or more of employment and income level, from the verification exchange computing system 100. In this manner, the verification exchange computing system 100 can facilitate the real-time completion of electronic transactions between client computing systems that are remote from one another and remote from the verification exchange computing system 100 (e.g., the verifier computing system 104 and the consumer computing system 106).

The verification exchange computing system 100 can receive the verification query 206 from the verifier computing system 104 via a public data network 108. For instance, the verifier computing system 104 and the verifier external-facing subsystem 112 can establish a secure communication channel, such as an SFTP connection, via the public data network 108. The verifier computing system 104 can generate a verification query 206 having multiple query parameters, such as a credential for the verifier computing system 104, an identifier of a consumer associated with the consumer computing system 106, and one or more requested verification operations to be performed by the verification exchange computing system (e.g., verify employment, verify income level, provide income level, etc.). The verifier computing system 104 transmit the verification query 206 via the secure communication channel. The verifier external-facing subsystem 112 can receive the verification query 206 via the secure channel and can transmit the received verification query 206 to the verification server 118 via a firewall device 116. The verification server 118 can extract the query parameters from the verification query 206. The verification server 118 can verify that an extracted credential matches one or more authorized credentials stored in the authorization database 130.

The verification server 118 can also verify that one or more requested verification operations specified by the verification query 206 are included in an authorized set of operations for the verifier computing system 104. For example, the verification server 118 can access authorization data stored in the authorization database 130, where the authorization data includes a flag or other data confirming that a verifier associated with the verifier computing system 104 has completed a suitable credentialing process. The credentialing process can involve, for example, determining whether the verifier has suitable qualifications to handle sensitive consumer data in accordance with legal or regulatory requirements, whether the verifier computing system 104 implements suitable security protocols for enforcing compliance with legal or regulatory requirements, etc. In some aspects, this flag or other data can also indicate that electronic transactions performed by the verifier computing system 104 require authenticating consumers and obtaining consent from consumers prior to accessing the verification exchange computing system 100. In other aspects, another query parameter in the verification query 206, such as a consumer credential provided in the transaction request 204, can indicate that the verifier computing system 104 has obtained consent from a consumer prior to accessing the verification exchange computing system 100 via the verification query 206.

The verification server 118 can generate a verification response 208 if the verification server 118 has verified that verification operations specified by the verification query 206 are included in an authorized set of operations for the verifier computing system 104. For example, the verification server 118 can select, from the consumer-status verification repository 122, a portion of the stored employment or income data that matches a query parameter in the verification query 206 (e.g., employment or income data having the identifier for the consumer). The verification server 118 can use the selected employment or income data to perform one or more verification operations specified in the verification query 206. For example, the verification server 118 can verify that the consumer has a specified income level, a specified employment status, etc. The verification server 118 can generate a verification response 208 that includes one or more results of the verification operations.

The verification server 118 can transmit the verification response 208 to the verifier computing system 104. For example, the verifier external-facing subsystem 112 can transmit the verification response 208 to the verifier computing system 104 via the secure channel over the public data network 108. The verifier computing system 104 can use the results of the verification response 208 to complete a requested electronic transaction with the consumer computing system 106. Completing the requested electronic transaction with the consumer computing system 106 can include transmitting a transaction response 210 to the consumer computing system 106. Examples of the transaction response 210 include authorizing access to one or more functions performed by an online service of the verifier computing system 104, completing an online sale and providing confirmation to the consumer computing system 106, transmitting requested data from the verifier computing system 104 to the consumer computing system 106, etc.

Figure 3:
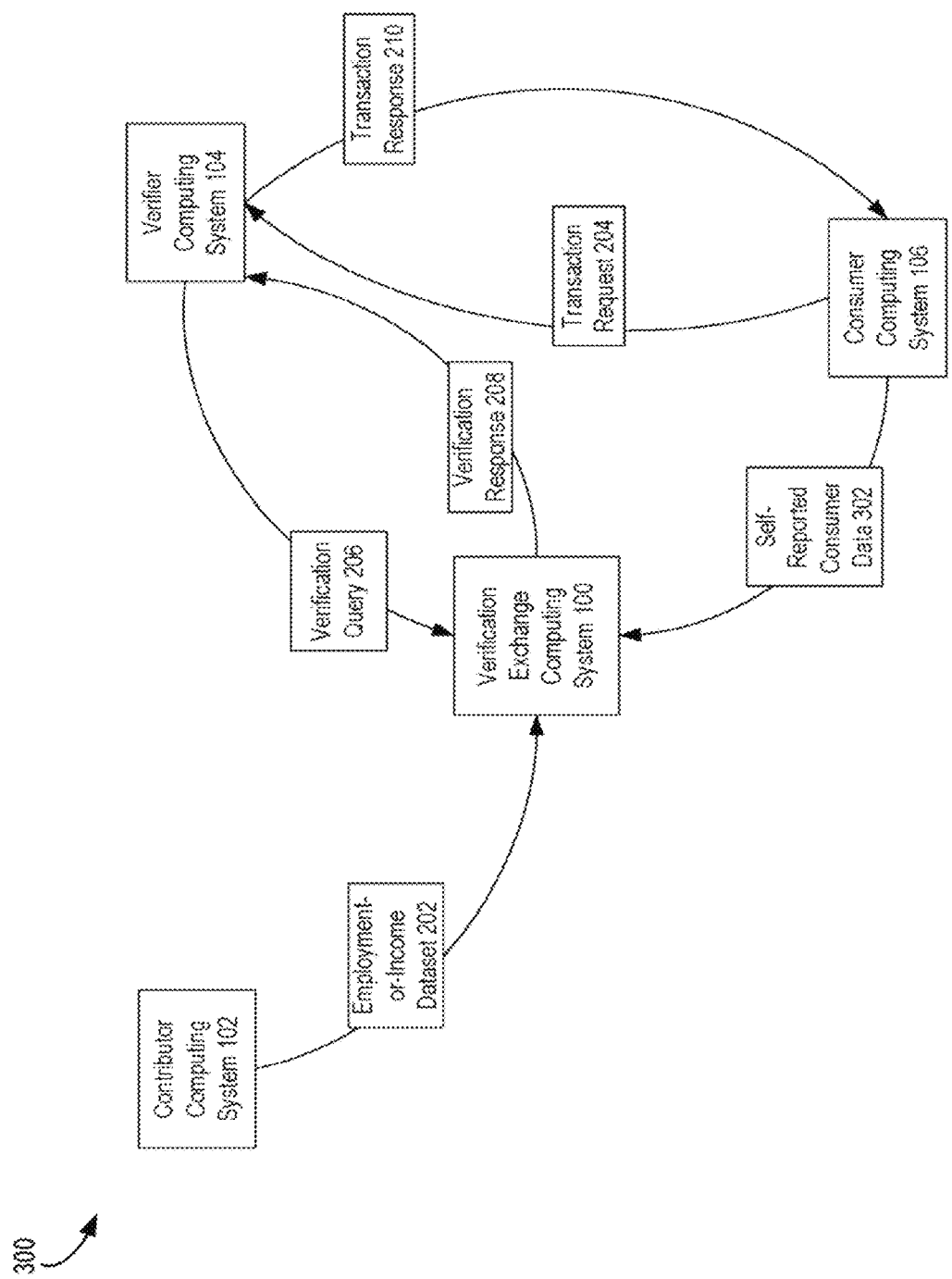
FIG. 3 is a data flow diagram depicting a modified version of the data flow of FIG. 2 in which self-reported employment or income data from a consumer computing system is used to augment the verification repository and service verification queries, according to certain aspects of this disclosure.

In some aspects, the verification exchange computing system 100 can augment the consumer-status verification repository 122 using self-reported data that is received in a manner that is out of band with respect to communications between the verification exchange computing system 100 and contributor computing systems 102. For example, FIG. 3 is a data flow diagram depicting a data flow 300 that is a modified version of the data flow 200. The data flow 300 can involve one or more of the computing devices depicted in FIG. 1 and can include any examples of processes described herein, but other implementations are possible. The data flow 300 can be performed in combination with one or more of the data flows depicted in FIGS. 4 and 5.

In the data flow 300, self-reported employment or income data from a consumer computing system is used to augment the consumer-status verification repository and service verification queries. A consumer computing system 106 can generate self-reported consumer data 302. For instance, self-reported data can be generated by the consumer computing system 106 accessing a consumer-based online service provided by the verification exchange computing system 100 (e.g., a web portal used by a consumer for accessing that consumer's employment or income data from the consumer-status verification repository 122). Examples of self-reported data include a consumer's address, employer name, base salary, hiring date, etc. Augmenting the consumer-status verification repository 122 with self-reported data can, for example, facilitate verification of employment, income, or both for self-employed consumers.

The consumer computing system 106 can establish a secure communication channel with the verification exchange computing system 100 via the consumer-based online service, where the secure communication channel is out-of-band with respect to (i.e. distinct from) any communication channel used by the verification exchange computing system 100 to communicate with contributor computing systems 102 or verifier computing systems 104.

The verification exchange computing system 100 can receive the self-reported consumer data 302 and use the self-reported consumer data 302 to augment other employment and income data stored in the consumer-status verification repository 122. For example, the verification exchange computing system 100 can receive multiple communications that include different sets of self-reported consumer data 302. The verification exchange computing system 100 can combine different sets of self-reported consumer data 302 into a common dataset for a consumer (e.g., a thin file that combines a consumer address from one communication with a base salary level from another communication). The verification exchange computing system 100 can execute one or more analytical or modeling algorithms to determine the accuracy of these sets of self-reported consumer data 302. For example, if a particular consumer has consistently reported the same values of self-reported consumer data 302 over a specified period, the verification exchange computing system 100 can assign a confidence level to the common dataset for the consumer. If the confidence level exceeds a threshold confidence level, the verification exchange computing system 100 can update employment and income data stored in the consumer-status verification repository 122 to include at least some of the self-reported consumer data 302. If the confidence level does not exceed a threshold confidence level, the verification exchange computing system 100 can segregate the self-reported consumer data 302 from the employment and income data for the consumer that is stored in the consumer-status verification repository 122. The self-reported consumer data 302 can remain segregated until further analysis or modeling increases the confidence level associated with the self-reported consumer data 302.

Figure 4:
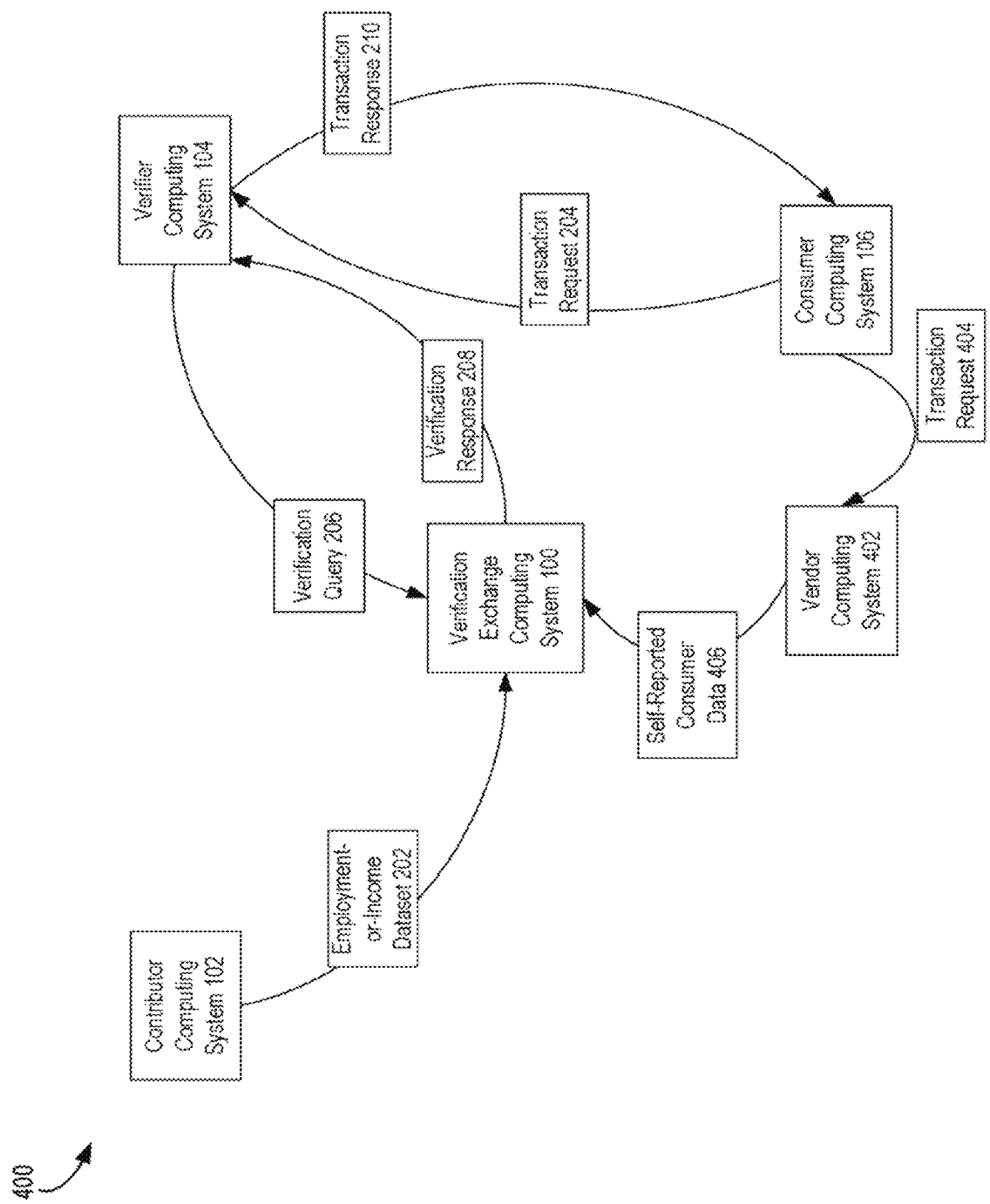
FIG. 4 is a data flow diagram depicting a modified version of the data flow of FIG. 2 in which self-reported employment or income data received from a consumer via a vendor computing system is used to augment the verification repository and service verification queries, according to certain aspects of this disclosure.

FIG. 4 is a data flow diagram depicting a data flow 400 that is another modified version of the data flow 200. The data flow 400 can involve one or more of the computing devices depicted in FIG. 1 and can include any examples of processes described herein, but other implementations are possible. The data flow 400 can be performed in combination with one or more of the data flows depicted in FIGS. 3 and 5.

In the data flow 400, self-reported employment or income data received from a consumer via a vendor computing system 402 is used to augment the consumer-status verification repository and service verification queries. The vendor computing system 402 can generate self-reported consumer data 406 based on one or more transaction requests 404 from a consumer computing system 106. Self-reported consumer data 406 can be generated by the consumer computing system 106 accessing a consumer-based online service provided by the vendor computing system 402 (e.g., an online loan application, a credit-verification service associated with the verification exchange computing system 100, etc.).

For instance, a consumer computing system 106 can be used to establish a session with an online service provided by the vendor computing system 402. The session can be used to perform electronic transactions between the consumer computing system 106 and the vendor computing system 402 over a public data network 108. During the session, the consumer computing system 106 can transmit a transaction request 404 to the vendor computing system 402. The transaction request 404 can include a request for an online service, which is provided by the vendor computing system 402, to perform one or more electronic operations on behalf of a user of the consumer computing system 106. The transaction request 404 (or another communication via the session) can include a consent message that authorizes the vendor computing system 402 to share self-reported consumer data 406 with a suitable system. The session between the consumer computing system 106 and the vendor computing system 402 can be out-of-band with respect to (i.e. distinct from) any communication channel used by the verification exchange computing system 100 to communicate with contributor computing systems 102 or verifier computing systems 104.

The verification exchange computing system 100 can receive the self-reported consumer data 406 and use the self-reported consumer data 406 to augment other employment and income data stored in the consumer-status verification repository 122. For example, the verification exchange computing system 100 can receive multiple communications from different, independent vendor computing systems 402 that include different sets of self-reported consumer data 406. The verification exchange computing system 100 can combine different sets of self-reported consumer data 406 into a common dataset for a consumer (e.g., a thin file that combines a consumer address from one communication with a base salary level from another communication). In some aspects, the verification exchange computing system 100 can execute one or more analytical or modeling algorithms to determine the accuracy of these sets of self-reported consumer data 406, as described above with respect to FIG. 3. The verification exchange computing system 100 can integrate or segregate the self-reported consumer data 406 in the manner described above with respect to FIG. 3. In additional or alternative aspects, the verification exchange computing system 100 can verify a quality of the data received by the vendor computing system 402. For instance, the verification exchange computing system 100 can determine that the vendor computing system 402 independently verifies the self-reported consumer data 406. Based on verifying the quality of the data received by the vendor computing system 402, the verification exchange computing system 100 can integrate the self-reported consumer data 406 with the income and employment data stored in the consumer-status verification repository 122.

Figure 5:
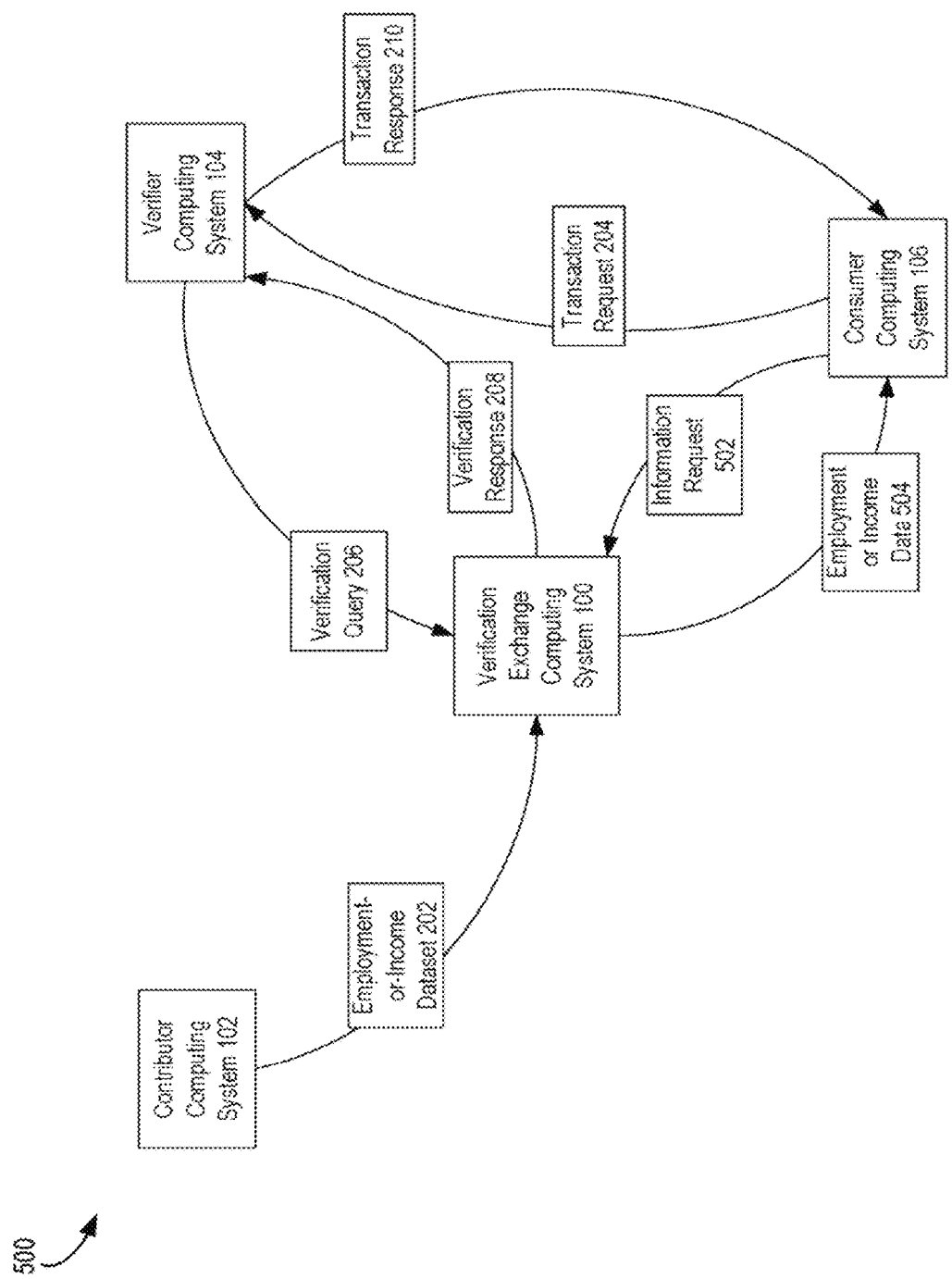
FIG. 5 is a data flow diagram depicting a modified version of the data flow of FIG. 2 in which a consumer computing system is provided with access to employment or income data from the verification repository, according to certain aspects of this disclosure.

In some aspects, the verification exchange computing system 100 can provide a consumer with access to employment data, income data, or both that is associated with the consumer and that is stored in the consumer-status verification repository 122. For example, FIG. 5 is a data flow diagram depicting a data flow 500 that is another modified version of the data flow 200. The data flow 500 can involve one or more of the computing devices depicted in FIG. 1 and can include any examples of processes described herein, but other implementations are possible. The data flow 500 can be performed in combination with one or more of the data flows depicted in FIGS. 3 and 4.

In the data flow 500, a consumer computing system 106 is provided with access to employment or income data stored in the consumer-status verification repository. The consumer computing system 106 can establish a session with an online service provided by the verification exchange computing system 100. The session can be used by the consumer computing system 106 to request some or all of a consumer's employment or income data stored in the consumer-status verification repository 122. During the session, the consumer computing system 106 can transmit an information request 502 to the verification exchange computing system 100. The information request 502 can include a credential for the consumer, such as a consumer identifier 136. In some aspects, the information request can be transmitted to the verification exchange computing system 100 via a web interface provided by the verification exchange computing system 100 via the consumer external-facing subsystem 114.

In some aspects, the information request 502 includes one or more credentials that are used by the verification exchange computing system 100 to authenticate a consumer and authorize a consumer computing system 106 to access certain income or employment verification data. For example, prior to the data flow 500, the verification exchange computing system 100 may generate or otherwise obtain a contributor identifier 134 for the consumer's employer and a consumer identifier 136 for the consumer. The verification exchange computing system 100 may also generate, for each consumer, a default password, personal identification number, or other authentication credential. The verification exchange computing system 100 can transmit one or more of the contributor identifier 134, the consumer identifiers 136, and the authentication credentials to the corresponding contributor computing system 102. The contributor computing system 102 can transmit the contributor identifier 134, a particular consumer identifier 136, and a particular authentication credential to the consumer computing system 106 depicted in FIG. 5. The information request 502, or another communication from the consumer computing system 106 to the verification exchange computing system 100, can include at least the particular consumer identifier 136 and authentication credential. (In some aspects, this communication can also include the contributor identifier.)

The verification exchange computing system 100 can authenticate the consumer using the received credentials (e.g., the particular consumer identifier 136 and default password). For example, the verification exchange computing system 100 can verify that a credential included in the information request 502 matches a consumer identifier 136 that is stored in the authorization database 130. If the match is verified, the verification exchange computing system 100 can retrieve one or more income data records 124, one or more employment data records 126, or both from the consumer-status verification repository 122. In some aspects, one or more of the consumer identifier 136 and the authentication credential for a consumer can be changed by the verification exchange service 120 in response to commands received from a consumer computing system 106 during a session between the consumer computing system 106 and the verification exchange computing system 100.

The retrieved employment or income data can be restricted to the employment or income data that corresponds to the matched credential. For example, the verification exchange computing system 100 can restrict access to the income data records 124 and the employment data records 126 based on the combination of credentials received from the consumer computing system 106. In some aspects, a particular consumer computing system 106 may only access income data records 124, employment data records 126, or both that correspond to the consumer identifier 136 provided from the consumer computing system 106 to the verification exchange computing system 100. In other aspects, a particular consumer computing system 106 may only access income data records 124, employment data records 126, or both that correspond to a combination of the contributor identifier 134 and the consumer identifier 136 provided from the consumer computing system 106 to the verification exchange computing system 100.

The consumer external-facing subsystem 114 can transmit employment or income data 504, which includes at least some of the retrieved employment or income data, to consumer computing system 106. The employment or income data 504 can be transmitted in any suitable manner (e.g., as an email attachment to, as a report in a web interface, etc.).

Examples of Verification Exchange Service Operations

Figure 6:
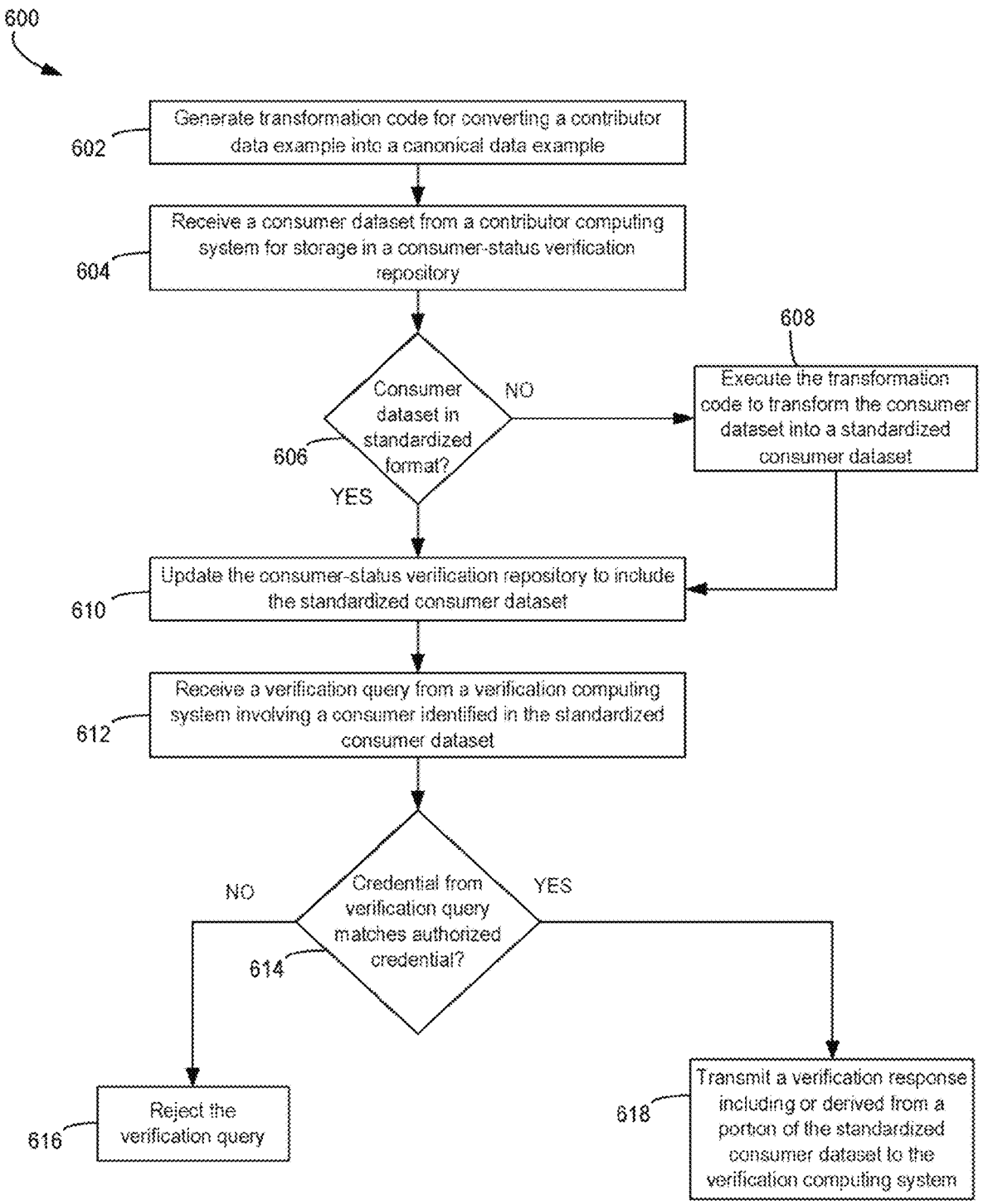
FIG. 6 is a flow chart illustrating an example of a process for updating the verification repository data structure of FIG. 1 by transforming employment or income data from a contributor computing system into a standardized format used for servicing verification queries by verifier computing systems involved in electronic transactions with consumer computing systems, according to certain aspects of this disclosure.

FIG. 6 is a flow chart illustrating an example of a process 600 for updating a consumer-status verification repository data structure by transforming employment or income data from a contributor computing system into a standardized format used for servicing verification queries by verifier computing systems involved in electronic transactions with consumer computing systems. For illustrative purposes, the process 600 is described with reference to implementations described above with respect to one or more examples described herein. Other implementations, however, are possible. In some aspects, the steps in FIG. 6 may be implemented in program code that is executed by one or more computing devices such as the verification server 118 depicted in FIG. 1. In some aspects of this disclosure, one or more operations shown in FIG. 6 may be omitted or performed in a different order. Similarly, additional operations not shown in FIG. 6 may be performed.

At block 602, the process 600 involves generating transformation code for converting a contributor data example, which is structured in a contributor format used by a contributor computing system 102, into a canonical data example, which is structured in a standardized format used by the consumer-status verification repository 122 to store income and verification data. The verification server 118 can execute the verification exchange service 120 and thereby perform one or more operations for generating the transformation code. For example, the verification exchange service 120 can access, from a non-transitory computer-readable medium, a canonical data example and a contributor data example. The canonical data example can include a dataset that is structured in a standardized format in the consumer-status verification repository 122. The contributor data example can include a dataset that is structured in a format specific to a contributor computing system 102. The verification exchange service 120 can execute one or more code generation algorithms that perform one or more transformation operations. A transformation operation can apply one or more operations to data stored in one or more fields of a contributor-provided dataset and thereby convert the data into transformed data that is structured in the standardized format.

Any suitable transformation operations can be included in the transformation code. One example of a transformation involves reformatting data by translating coded values from a source coding scheme (e.g., coding employment status as "active" and "terminated") to a coding scheme used by the consumer-status verification repository 122 (e.g., coding employment status as "employed" and "unemployed"). Another example of a transformation involves mapping long-form terms to short-form terms (e.g., "Male" to "M"), or vice versa. Another example of a transformation involves computing a certain data value from one or more other data values. Another example of a transformation involves reordering fields, which can improve search performance. Another example of a transformation transposing or pivoting data, splitting one field into multiple fields, etc.

In some aspects, the generated transformation code can include a transformation operation that modifies a given field's data format (e.g., the coding of data, use of long-form versus short-form, use of integers versus real numbers, etc.). Various contributor-specific mappings allow the verification exchange service 120 to generate transformation code that converts differently formatted income or employment data from different contributor computing systems 102 into a standardized format used by the consumer-status verification repository 122. For example, the verification exchange service 120 can access a contributor-specific mapping between a field of the canonical data example and a field of the contributor data example. The verification exchange service 120 can compare the two mapped fields to determine a change in formatting from the field of the canonical data example and the field of the contributor data example. The verification exchange service 120 can generate a section of the transformation code that implements the formatting change.

In additional or alternative aspects, the transformation code can include a transformation operation combining multiple fields from the contributor data example into a common field of the canonical data example. For example, the verification exchange service 120 can access a mapping between a set of fields from the canonical data example and a target field from the contributor data example. The verification exchange service 120 can compare data in the target field with data in the mapped fields. The verification exchange service 120 can determine, from the comparison, a combination function combining data values from the set of fields in the contributor data example into a combined data value in the target field of the canonical data example. Examples of combination functions include a weighted sum, a quadratic function, etc. The verification exchange service 120 can generate a transformation code section implementing the combination function.

The process 600 also involves receiving an employment or income dataset from a contributor computing system for storage in a consumer-status verification repository, as depicted at block 604. The employment or income dataset can describe a set of consumers. For example, an employment or income dataset can include, for each consumer entity, an identifier of the consumer entity and one or more attributes of the consumer (e.g., income level, employment status, etc.). The verification server 118 can execute the verification exchange service 120 and thereby perform one or more operations for communicating with a contributor computing system 102 to obtain the employment or income dataset.

The verification exchange service 120 can communicate with one or more contributor computing systems 102 to obtain the employment or income dataset. In some aspects, a contributor external-facing subsystem 110 can communicate with a contributor computing system 102 via a public data network 108, such as the Internet. The contributor external-facing subsystem 110 can establish a secure communication channel, such as an SFTP connection, over the public data network 108 and with the contributor computing system 102. In some aspects, the secure communication channel can be automatically established on a periodic basis (e.g., each week, each bi-week, etc.). In additional or alternative aspects, the secure communication channel can be established by one or more computing systems in response to a command received via a user interface. The contributor external-facing subsystem 110 can receive the employment or income dataset via the secure communication channel. The contributor external-facing subsystem 110 can transmit the employment or income dataset to the verification server 118 via the firewall device 116.

The process 600 also involves determining whether the employment or income dataset is in a standardized format, as depicted at block 606. The verification server 118 can execute the verification exchange service 120 and thereby perform one or more operations for determining the format of the received employment or income dataset. For example, the verification exchange service 120 can identify the organization of the received employment or income dataset (e.g., the number of fields, the arrangement of fields, etc.). The verification exchange service 120 can also identify the format of each field (e.g., the datatypes included in each field, the format of numerical values, etc.). The verification exchange service 120 can compare the identified organization and formatting to the organization and data formatting of the income data records 124, the income data records 124, or both as stored in the consumer-status verification repository 122. Based on the comparison, the verification exchange service 120 can determine whether the received employment or income dataset has the same organization and data formatting as the standardized data format. If the employment or income dataset is in a standardized format, the process 600 also involves updating the consumer-status verification repository to include the standardized employment or income dataset, as depicted at block 610, described below.

If the employment or income dataset is not in a standardized format, the process 600 also involves executing the transformation code to transform the employment or income dataset into a standardized employment or income dataset, as depicted at block 608. The verification server 118 can execute the transformation code and thereby perform an algorithm defined by the transformation code for converting, combining, or otherwise modifying data from the received employment or income dataset to generate a standardized employment or income dataset. For example, the verification exchange service 120 can perform one or more operations such as modifying an order of fields in the received employment or income dataset, modifying a data format in a field of the received employment or income dataset, or combining data values from a set of fields in the received employment or income dataset into a target value of a target field of an income data record 124 or employment data record 126. The process 600 can proceed to block 610.

The process 600 also involves updating the consumer-status verification repository to include the standardized employment or income dataset, as depicted at block 610. The verification server 118 can execute the verification exchange service 120 and thereby perform one or more operations for integrating the standardized employment or income dataset with stored data in the consumer-status verification repository 122.

In one example, the verification exchange service 120 can search for existing income data records 124, employment data records 126, or both that have consumer identifiers matching one or more consumer identifiers in the standardized employment or income dataset. The verification exchange service 120 can retrieve any existing income data records 124, employment data records 126, or both that match consumer identifiers in the standardized employment or income dataset. The verification exchange service 120 can modify the retrieved records to include data values from the standardized employment or income dataset. For example, the verification exchange service 120 can update a particular consumer's employment status, income level, or both by modifying that consumer's income data record 124 or employment data record 126.

In another example, the verification exchange service 120 can determine that at least some of the consumers identified in the standardized employment or income dataset do not have matching records in the consumer-status verification repository 122. The verification exchange service 120 can create income data records 124, employment data records 126, or both that have consumer identifiers for these consumers, where the consumer identifiers are obtained from the standardized employment or income dataset. The verification exchange service 120 can modify the created records to include data values from the standardized employment or income dataset. For example, the verification exchange service 120 can add a particular consumer's employment status, income level, or both to that consumer's income data record 124 or employment data record 126.

In some aspects, the verification exchange computing system 100 can provide contributor computing systems 102 with access to one or more reporting features. For example, the contributor external-facing subsystem 110 can establish a secure communication channel, such as an HTTPS connection, over the public data network 108 and with the contributor computing system 102. The secure communication channel can be established by one or more of the computing systems in response to a command received via a user interface that is presented at the contributor computing system 102. The contributor external-facing subsystem 110 can transmit, via the secure communication channel, a reporting interface to the contributor computing system 102. The contributor external-facing subsystem 110 can subsequently receive communications initiated by commands received via the reporting interface at the contributor computing system 102. The contributor external-facing subsystem 110 can respond to the communications by providing one or more summaries, analyses, or other reports regarding one or more employment or income datasets that have been provided by the contributor computing system 102. In some aspects, the verification exchange computing system 100 can restrict access to various employment or income datasets provided by contributors such that a contributor computing system 102 associated with a given contributor is limited to accessing only employment or income datasets provided by that contributor.

The process 600 also involves receiving a verification query from a verification computing system involving a consumer identified in the standardized employment or income dataset, as depicted at block 612. The verification server 118 can execute the verification exchange service 120 and thereby perform one or more operations for communicating with a verifier computing system 104 to receive a verification query. The verification query can include any suitable query parameters for identifying one or more consumer entities. Examples of query parameters include personally identifiable information ("PII") data and a request category (e.g., an income level request, an employment data request, etc.). In some aspects, multiple verification queries can be bundled into a batch verification request. For example, hundreds or thousands of verification queries may be included in a batch verification request from verifier computing system 104 that services a large verifier entity (e.g., large lenders, government agencies, etc.).

In some aspects, the verifier external-facing subsystem 112 can communicate with a verifier computing system 104 via a public data network 108, such as the Internet. The verifier external-facing subsystem 112 can establish a secure communication channel (e.g., an SFTP connection, an HTTP connection, etc.) over the public data network 108 and with the verifier computing system 104. In some aspects, the secure communication channel can be automatically established on a periodic basis (e.g., each week, each bi-week, etc.). In additional or alternative aspects, the secure communication channel can be established by one or more of the computing systems in response to a command received via a web interface that is provided from the verification exchange computing system 100 (e.g., using the verifier external-facing subsystem 112) to the verifier computing system 104. The verifier external-facing subsystem 112 can receive one or more verification queries via the secure communication channel. The verifier external-facing subsystem 112 can transmit the verification query to the verification server 118 via the firewall device 116.

The process 600 also involves determining whether a credential included with the verification query matches an authorized credential, as depicted at block 614. The verification server 118 can execute the verification exchange service 120 and thereby perform one or more authentication operations, authorization operations, or both.

For example, the verification exchange service 120 can access the authorization database 130 stored in a non-transitory computer-readable medium. The verification exchange service 120 can query the authorization database 130 for a verifier record 138 that includes an authorization credential 140 that matches a received credential included in the verification request. If the query does not return a verifier record 138 that includes a matching authorization credential 140, the verification exchange service 120 can determine that the credential included with the verification query does not match an authorized credential, and the process 600 can proceed to block 616.

If the query returns a verifier record 138 that includes a matching authorization credential 140, the verification exchange service 120 can compare the authorization 142 of the returned verifier record 138 with the requested verification query. The authorization 142 of the returned verifier record 138 may include (or be otherwise associated with) a rule permitting the requested verification query by the identified verifier computing system 104. If so, the verification exchange service 120 can determine that the credential included with the verification query does matches an authorized credential, and the process 600 can proceed to block 618. Otherwise, the verification exchange service 120 can determine that the credential included with the verification query does not match an authorized credential, and the process 600 can proceed to block 616.

If the credential included with the verification query does not match an authorized credential, the process 600 also involves rejecting the verification query, as depicted at block 616. For example, the verification exchange service 120 can configure the verifier external-facing subsystem 112 to transmit a rejection message to the verifier computing system 104 via the data network. The rejection message can indicate that the requested verification operations are not authorized for that verifier. In some aspects, the rejection message can identify one or more errors in the received verification query. These errors can indicate, for example, that consent has not been obtained for particular consumers, that the verifier has not completed a credentialing process, that the requested verification operation is outside the scope of an authorization 142 for a particular verifier credential, etc.

If the credential included with the verification query matches an authorized credential, the process 600 also involves transmitting a verification response, which includes or is derived from a portion of the standardized employment or income dataset, to the verification computing system from which the verification query was received, as depicted at block 618. The verification server 118 can execute the verification exchange service 120 and thereby perform one or more operations for providing the verification response to the contributor computing system.

In some aspects, the verifier external-facing subsystem 112 can communicate with a verifier computing system 104 via a public data network 108, such as the Internet. The verifier external-facing subsystem 112 can establish a secure communication channel (e.g., an SFTP connection, an HTTPS connection, etc.) with the verifier computing system 104. The verifier external-facing subsystem 112 can receive the verification response from the verification server 118 via the firewall device 116. The verifier external-facing subsystem 112 can transmit the verification response to the verifier computing system 104 via the secure communication channel.

Figure 7:
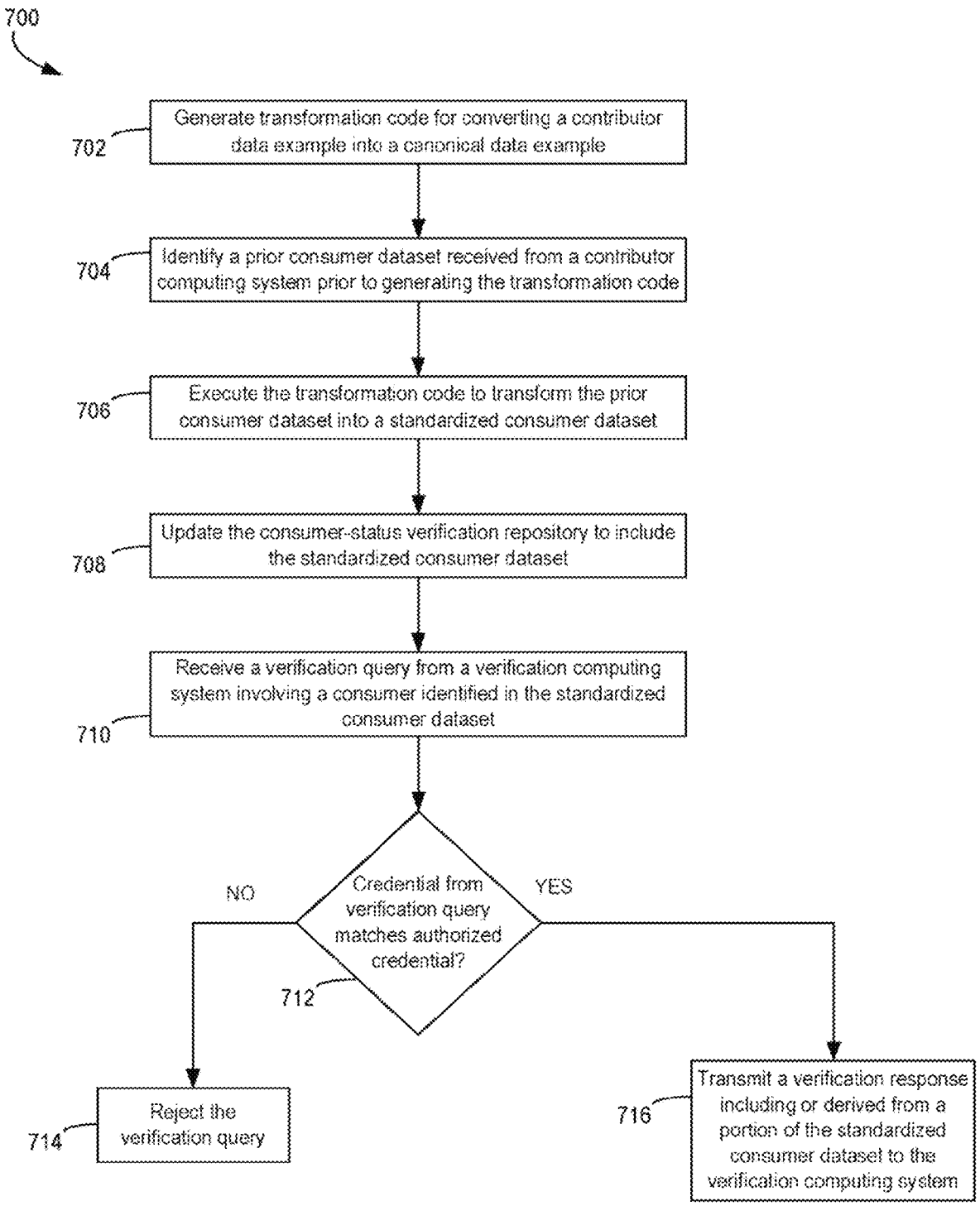
FIG. 7 is a flow chart illustrating an example of a process for updating the verification repository data structure of FIG. 1 by transforming previously received employment or income data into a standardized format used for servicing verification queries by verifier computing systems involved in electronic transactions with consumer computing systems, according to certain aspects of this disclosure.

In some aspects, previously stored data in the consumer-status verification repository can be reformatted or otherwise updated to comply with new data structure specifications, new mappings of contributor data to verification repository data, etc. For example, FIG. 7 is a flow chart illustrating an example of a process 700 for updating a consumer-status verification repository data structure by transforming previously received employment or income data into a standardized format used for servicing verification queries by verifier computing systems involved in electronic transactions with consumer computing systems. For illustrative purposes, the process 700 is described with reference to implementations described above with respect to one or more examples described herein. Other implementations, however, are possible. In some aspects, the steps in FIG. 7 may be implemented in program code that is executed by one or more computing devices such as the verification server 118 depicted in FIG. 1. In some aspects of this disclosure, one or more operations shown in FIG. 7 may be omitted, may be performed in a different order, or may be performed in combination with one or more operations depicted in FIGS. 2-6. Similarly, additional operations not shown in FIG. 7 may be performed.

The process 700 involves generating transformation code for converting a contributor data example into a canonical data example, as depicted at block 702. The verification server 118 can execute the verification exchange service 120 and thereby perform one or more operations for implementing block 702. Block 702 may be implemented in a manner similar to block 602 of the process 600.

The process 700 also involves identifying a prior employment or income dataset received from a contributor computing system prior to generating the transformation code, as depicted at block 704. The verification server 118 can execute the verification exchange service 120 and thereby perform one or more operations for identifying one or more prior employment or income datasets from contributors. For instance, the verification exchange service 120 can identify a contributor identifier for a particular mapping that is used to generate transformation code at block 702. The verification exchange service 120 can access the consumer-status verification repository 122 and query the consumer-status verification repository 122 for prior employment or income datasets received from the contributor computing system 102 corresponding to the contributor identifier.

In some aspects, a certain portion of the consumer-status verification repository 122 may be used by the verification exchange service 120 to store archived versions of untransformed employment or income data. The archived versions of employment or income data may be stored to facilitate efficient updates to the consumer-status verification repository 122. For instance, changes in regulatory requirements by a certain jurisdiction (e.g., a country, a province, etc.) may necessitate one or more changes to the structure of the consumer-status verification repository 122. Examples of these changes include masking certain field values, combining different field values into an aggregate value, etc. If the structure of the consumer-status verification repository 122 has been changed, archived versions of employment or income data for a particular contributor can be retrieved at block 704. The transformation code generated at block 702, which corresponds to the updated structure of the consumer-status verification repository 122, can be used to transform these archived versions into a standardized format used by the updated structure of the consumer-status verification repository 122.

The process 700 also involves executing the transformation code to transform the prior employment or income dataset into a standardized employment or income dataset, as depicted at block 706. The verification server 118 can execute the verification exchange service 120 and thereby perform one or more operations for transforming one or more employment or income datasets obtained at block 704 into standardized datasets that are compliant with the current structure of the consumer-status verification repository 122. One or more of the transformation operations described with respect to process 600 may be applied at block 706 to transform the employment or income datasets obtained at block 704.

The process 700 also involves updating the consumer-status verification repository to include the standardized employment or income dataset, as depicted at block 708. The verification server 118 can execute the verification exchange service 120 to implement block 708. Block 708 may be implemented in a manner similar to block 610 of the process 600. If the process 700 is being used to update the stored income and employment data due to an updated structure of the consumer-status verification repository 122, blocks 702-708 can be repeated for each contributor whose data is stored in the consumer-status verification repository 122.

The process 700 also involves receiving a verification query from a verification computing system involving a consumer identified in the standardized employment or income dataset, as depicted at block 710. The verification server 118 can execute the verification exchange service 120 and thereby perform one or more operations for implementing block 710. Block 710 may be implemented in a manner similar to block 612 of the process 600.

The process 700 also involves determining whether a credential included with the verification query matches authorized credential, as depicted at block 712. The verification server 118 can execute the verification exchange service 120 and thereby perform one or more operations for implementing block 712. Block 712 may be implemented in a manner similar to block 614 of the process 600.

The process 700 also involves rejecting the verification query, as depicted at block 714. The verification server 118 can execute the verification exchange service 120 and thereby perform one or more operations for implementing block 714. Block 714 may be implemented in a manner similar to block 616 of the process 600.

The process 700 also involves transmitting a verification response, which includes or is derived from a portion of the standardized employment or income dataset, to the verification computing system, as depicted at block 716. The verification server 118 can execute the verification exchange service 120 and thereby perform one or more operations for implementing block 716. Block 716 may be implemented in a manner similar to block 616 of the process 600.

Figure 8:
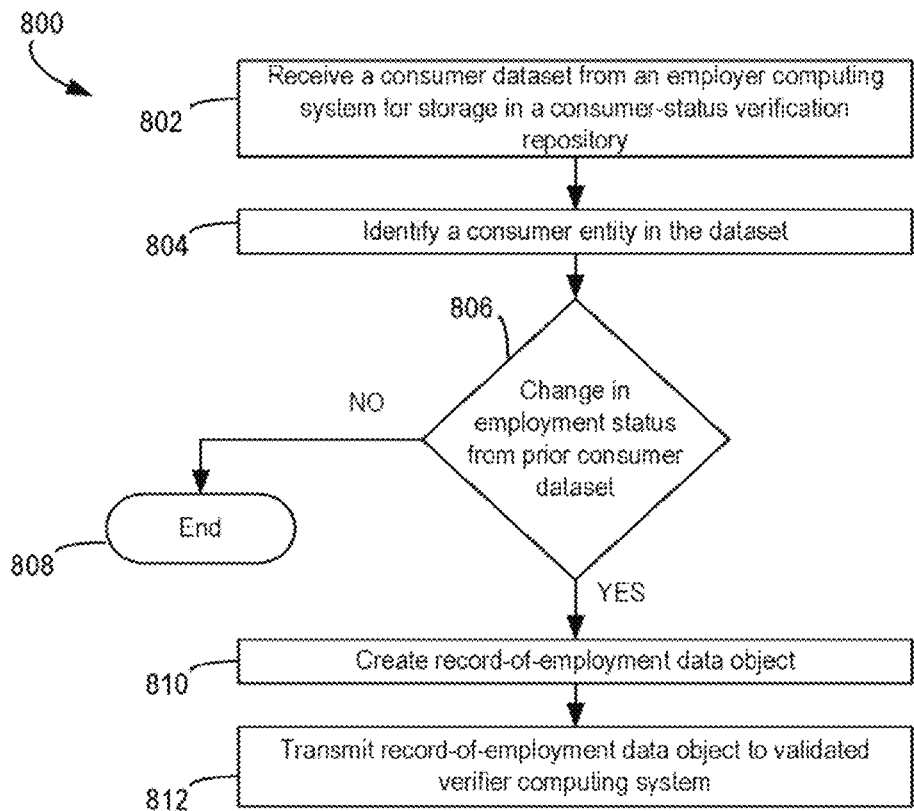
FIG. 8 is a flow chart illustrating an example of a process for creating a record-of-employment data object from a verification repository data structure

In some aspects, the verification exchange computing system 100 can also be used to provide reporting data to validate verifier computing systems, such as computing systems operated by government agencies and other trusted entities. For example, FIG. 8 is a flow chart illustrating an example of a process 800 for creating a record-of-employment data object from a consumer-status verification repository data structure. For illustrative purposes, the process 800 is described with reference to implementations described above with respect to one or more examples described herein. Other implementations, however, are possible. In some aspects, the steps in FIG. 8 may be implemented in program code that is executed by one or more computing devices such as the verification server 118 depicted in FIG. 1. In some aspects of this disclosure, one or more operations shown in FIG. 7 may be omitted, may be performed in a different order, or may be performed in combination with one or more operations depicted in FIGS. 2-7. Similarly, additional operations not shown in FIG. 8 may be performed.

The process 800 involves receiving an employment or income dataset from an employer computing system for storage in a consumer-status verification repository, as depicted at block 802. The verification server 118 can execute the verification exchange service 120 and thereby perform one or more operations for implementing block 802. Block 802 may be implemented in a manner similar to block 604 of the process 600.

The process 800 also involves identifying a consumer entity in the dataset, as depicted at block 804. For example, the verification exchange service 120 can select a consumer identifier from the dataset.

The process 800 also involves detecting a change in an employment status from a prior employment or income dataset, as depicted at block 806. For example, the verification exchange service 120 can access an employment data record 126 for the consumer entity identified at block 804. The verification exchange service 120 can access the employment data record 126 by retrieving the employment data record 126 from the consumer-status verification repository 122 using the consumer identifier. The verification exchange service 120 can compare an employment status in the retrieved employment data record 126 with an employment status for the identified consumer entity in the received employment or income dataset. The verification exchange service 120 can determine, based on the comparison, that the employment status in the retrieved employment data record 126 is different from the employment status in the received employment or income dataset. In this manner, the verification exchange service 120 can detect a change in the employment status.

The process 800 terminates at block 808 if no change in an employment status from a prior employment or income dataset is detected. But if a change in an employment status from a prior employment or income dataset is detected, the process 800 also involves creating record-of-employment data object, as depicted at block 810. For example, the verification exchange service 120 can retrieve, from a non-transitory computer-readable medium, a specified template for a particular recipient of record-of-employment data object (e.g., a government agency that tracks employment data, provides social service benefits, etc.). The verification exchange service 120 can create record-of-employment data object that has the fields identified in the specified template. The verification exchange service 120 can populate the fields with one or more data values identifying the consumer and one or more data values indicating the consumer's current employment status, prior employment status, current income level, prior income level, or some combination thereof.

The process 800 also involves transmitting a record-of-employment data object to validated verifier computing system (e.g., a government-controlled verifier computing system), as depicted at block 812. For example, the verification exchange service 120 can configure a verifier external-facing subsystem 112 to establish a secure connection (e.g., an SFTP connection) with the validated verifier computing system. The verification server 118 can transmit the record-of-employment data object to the verifier external-facing subsystem 112 via the firewall device 116. The verifier external-facing subsystem 112 can transmit the record-of-employment data object to the validated verifier computing system via the secure connection. In some aspects, the validated verifier computing system can respond with an acknowledgement that the record-of-employment data object is error-free and has been stored by the validated verifier computing system.

In some aspects, the process 800 eliminates the need for a manual, error-prone process for generating records of employment. For instance, certain government agencies may require that a record of employment must be generated within a specified time frame (e.g., within four weeks of termination of employment). The verification exchange service 120 can ensure that the record of employment is generated within this time frame. Automated transfers of employment and income data (e.g., at block 802) from the employers' contributor computing systems 102 at certain scheduled intervals (e.g., every week, every pay period, etc.) can trigger a comparison of employment statuses (e.g., at block 806). The verification exchange service 120 can therefore execute process 800 within a short time period of a change in employment status (e.g., within the same pay period) and thereby generate a record of employment for a given consumer within a required period.

Although the verification queries described herein involve confirmations of employment or income levels, the verification exchange computing system 100 can also service other types of queries using data describing sets of consumers. In some aspects, the verification exchange computing system 100 can generate, compute, or otherwise derive analytics data from income data records 124, employment data records 126, or other data stored in the consumer-status verification repository 120.

For example, a server within the verification exchange computing system 100 (e.g., the verification server 118) can execute an analytical module that computes analytics data from data stored in the consumer-status verification repository 120. The analytics can be performed on anonymized version of the data in the consumer-status verification repository 120, thereby enforcing privacy restrictions and other access-control measures with respect to the data in the consumer-status verification repository 120. The anonymized data can be extracted from income or employment data, which is gathered at regular intervals from reliable sources (e.g., contributor systems such as employers, payroll systems, etc.). Thus, the verification exchange computing system 100 can generate and provide accurate, real-time analytics with respect to various consumer attributes stored by the consumer-status verification repository 120.

For example, these analytics can include job-title compensation analytics using real-time income data across multiple contributors. One or more standardization operations performed by the verification exchange computing system 100, such as the operations performed at block 608 of the process 600 or block 706 of the process 700, can involve standardizing job titles, employment industries, or other consumer descriptors. The verification computing system can transform a set of different consumer descriptors (e.g., a set of different job titles), which are received from different contributor system 102 and that refer to a common entity type (e.g., the same job or position in an industry), into a standardized consumer descriptor (e.g., a standardized job title). These standardization operations can, for example, facilitate accurate comparison and analysis of different job titles, despite inconsistent labeling schemes being used by different contributors, by assigning consistent job titles or other descriptors to consumers.

Any suitable transformation operations can be performed to standardize job titles or other text descriptors. For example, the verification exchange computing system 100 can ensure that all letters of a text descriptor are in a common case (e.g., by converting letters to upper case), which can facilitate string-insensitive comparisons of one or more portions of a text descriptor (e.g., a non-standardize job title) to one or more tokens in one or more look-up tables. The verification exchange computing system 100 can also trim or otherwise reduce white space in the text descriptor. The verification exchange computing system 100 can also remove special characters identified as invalid in a look-up table (e.g., ">," "%," "<," "$," "#," etc.) The verification exchange computing system 100 can also remove other invalid portions of a descriptor that are identified via a look-up table, such as a set of repeating letters (e.g., "AAA," "ZZZ," etc.) at the beginning of a descriptor. The verification exchange computing system 100 can also remove non-alphabetical characters from the beginning of a descriptor (e.g., transforming the descriptor "#584-REST CLERK" into "REST CLERK" by removing the set of characters "#584-," which includes numeric and special characters).

Continuing with the title-standardization example, the verification exchange computing system 100 can standardize tokens in the received text descriptor by referencing one or more look-up tables that map a standard token (e.g., "JR") to and one or more variants (e.g., "JUNIOR," "JR.," etc.). The verification exchange computing system 100 can use these associations to replace the variants "JUNIOR," "PART TIME," and "F/T" with their respective standardized tokens "JR," "PT," and "FT." The verification exchange computing system 100 can also replace abbreviations in the descriptor. For example, the verification exchange computing system 100 can use one or more mapping tables to replace tokens that include abbreviations or short words (e.g., "MGR," "MKTG," "OPS," etc.) with their corresponding long forms (e.g., "MANAGER," "MARKETING," "OPERATIONS," etc.). The system can also standardize levels indicated by the descriptor (e.g., transforming the descriptor "MANAGER 2" into "MANAGER II" by replacing the final token "2" with the standardized level token "II").

The verification exchange computing system 100 can use the standardized job titles or other consumer descriptor data to generate analytics. For instance, a computing device, such as the verification server 118, can retrieve a dataset from the repository 122 for analysis. The dataset can be retrieved using one or more standardized descriptors (e.g., all records matching a certain job title, industry, etc.). For analytical operations, the repository 122 can return anonymized data. An example of anonymized data may include a dataset that include job title, income information, and region information and that excludes PII data (e.g., name, social insurance number, street address, etc.).

The computing device can execute one or more analytical algorithms that use the anonymized version of the consumer data to generate suitable analytics (e.g., peer compensation benchmarks by job title, industry, region, etc.). The analytics can be provided to one or more client systems of the verification exchange computing system 100. For example, an employer, employee, verifier, or other entity can access a compensation comparison or other analytics via a web interface provided through a suitable external-facing system.

Example of Computing Environment for Verification Exchange Service

Figure 9:
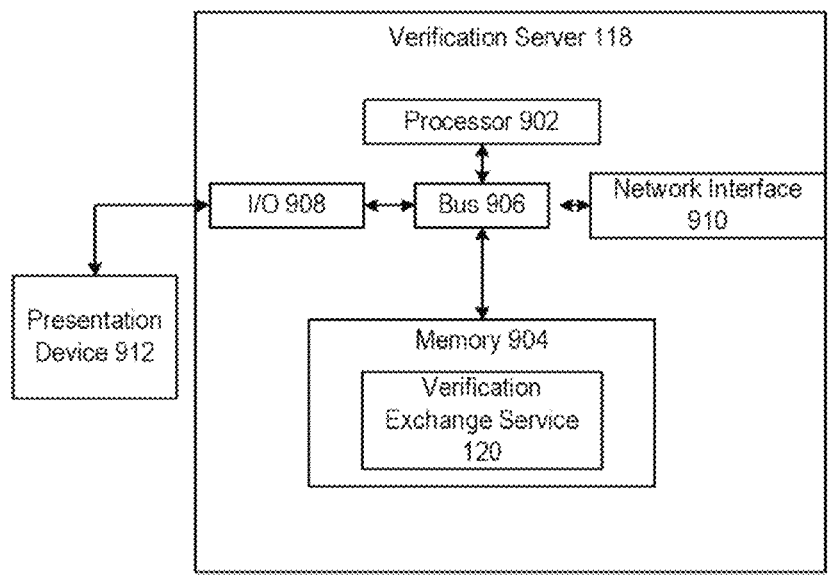
FIG. 9 is a block diagram depicting an example of a verification exchange server system, according to certain aspects of this disclosure.

Any suitable computing system or group of computing systems can be used to perform the model optimization operations described herein. For example, FIG. 9 is a block diagram depicting an example of a verification server 118. The example of the verification server 118 can include various devices for communicating with other devices in the verification exchange computing system 100, as described with respect to FIG. 1. The verification server 118 can include various devices for performing one or more transformation operations described above with respect to FIGS. 1-8.

The verification server 118 can include a processor 902 that is communicatively coupled to a memory 904. The processor 902 executes computer-executable program code stored in the memory 904, accesses information stored in the memory 904, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 902 include a microprocessor, an application-specific integrated circuit, a field-programmable gate array, or any other suitable processing device. The processor 902 can include any number of processing devices, including one. The processor 902 can include or communicate with a memory 904. The memory 904 stores program code that, when executed by the processor 902, causes the processor to perform the operations described in this disclosure.

The memory 904 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The verification server 118 may also include a number of external or internal devices such as input or output devices. For example, the verification server 118 is shown with an input/output interface 908 that can receive input from input devices or provide output to output devices. A bus 906 can also be included in the verification server 118. The bus 906 can communicatively couple one or more components of the verification server 118.

The verification server 118 can execute program code that includes the verification exchange service 120. This program code may be resident in any suitable computer-readable medium and executed on any suitable processing device. For example, as depicted in FIG. 9, the program code for the verification exchange service 120 can reside in the memory 904 at the verification server 118. Executing the verification exchange service 120 can configure the processor 902 to perform the operations described herein.

In some aspects, the verification server 118 can include one or more output devices. One example of an output device is the network interface device 910 depicted in FIG. 9. A network interface device 910 can include one or more devices for establishing a wired or wireless data connection to one or more data networks described herein. Examples of the network interface device 910 include an Ethernet network adapter, a modem, etc.

Another example of an output device is the presentation device 912 depicted in FIG. 9. A presentation device 912 can include any device or group of devices suitable for providing visual, auditory, or other suitable sensory output. Non-limiting examples of the presentation device 912 include a touchscreen, a monitor, a speaker, a separate mobile computing device, etc. In some aspects, the presentation device 912 can include a remote client-computing device that communicates with the verification server 118 using one or more data networks described herein. Other aspects can omit the presentation device 912.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" recited conditions or values may, in practice, be based on additional conditions or values beyond those recited. Headings, lists, and numbering included herein are for ease of explanation only, not limitation.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that this disclosure has been presented for purposes of example rather than limitation, and does not preclude inclusion of such modifications, variations, or additions to the present subject matter as would be readily apparent to one of ordinary skill in the art.

What is claimed is:

1. A verification exchange computing system comprising:
in a secured part of the verification exchange computing system:
a verification exchange server system configured for generating and executing transformation code, the transformation code comprising a plurality of sections and including at least one operation to convert employment or income data from contributor computing systems to a standardized format,
wherein generating the transformation code includes:
accessing a contributor-specific mapping between a set of contributor fields of the employment or income data and a standardized field having the standardized format, the contributor-specific mapping identifying a data structure relationship between a set of data values received from a particular contributor computing system and standardized data in the standardized field,
determining, based on the data structure relationship, a combination function to combine the set of data values into the standardized field, and
generating a contributor-specific section of the transformation code that implements the combination function on the set of data values received from the particular contributor computing system,
wherein executing the transformation code includes combining the set of contributor fields into a target field having the standardized format by computing a new data value from the set of data values;
a consumer-status verification repository to store standardized employment or income data having the standardized format; and
an access authorization database to store contributor identifiers and authorization credentials usable by the verification exchange server system to verify an accessor prior to providing the employment or income data from the consumer-status verification repository to the accessor,
wherein the verification exchange server system in the secured part of the verification exchange computing system is configured for:
matching a credential in a verification query to an authorized credential from the access authorization database, the verification query requesting confirmation of an employment or income level for at least one consumer associated with the standardized employment or income data, wherein matching the credential restricts access to the employment or income level to accessors that are a requesting verifier computing system having the credential that matches the authorized credential,
restricting access to the standardized employment or income data to accessors that are (i) an originating contributor computing system for the employment or income data or (ii) consumers described by the standardized employment or income data, and
in response to matching the credential in the verification query to the authorized credential, providing the confirmation of employment or income level to a verifier external-facing device configured for transmitting a verification response to the requesting verifier computing system, and in an unsecured part of the verification exchange computing system:
a contributor external-facing device configured for communicating with the verification exchange server system through a security portal and for communicating with the contributor computing systems via a public data network; and
the verifier external-facing device.

2. The verification exchange computing system of claim 1, wherein generating the transformation code comprises:
determining, based on a comparison between example data in the standardized field and additional data in the set of contributor fields, a format change between the standardized field and a field of the set of contributor fields; and
generating the contributor-specific section of the transformation code that implements the format change.

3. The verification exchange computing system of claim 1, wherein generating the transformation code comprises:
determining the combination function to transform the set of contributor fields into the target field based on a comparison between example data in the set of contributor fields and the target field; and
generating the contributor-specific section of the transformation code that implements the combination function.

4. The verification exchange computing system of claim 1, wherein the verification exchange computing system is further configured for performing additional operations comprising:
prior to generating the transformation code:
identifying a change to a structure of data stored in the consumer-status verification repository;
accessing the contributor-specific mapping from (i) an example of contributor data in a contributor-specific format of the particular contributor computing system to (ii) an example of data having the standardized format, wherein the contributor-specific mapping reflects the change to the structure of data stored in the consumer-status verification repository;
identifying prior employment or income data received prior to the change to the structure of data stored in the consumer-status verification repository;
executing the transformation code to transform the prior employment or income data into additional standardized employment or income data; and
updating the consumer-status verification repository to include the additional standardized employment or income data.

5. The verification exchange computing system of claim 1,
wherein the contributor external-facing device is configured for receiving the employment or income data from the particular contributor computing system via a secure FTP connection and transmitting the employment or income data to the verification exchange server system via a firewall device,
wherein the verifier external-facing device is configured for:
providing a web interface to the verifier external-facing device via a secure HTTP connection,
receiving the verification query from the requesting verifier computing system via the secure HTTP connection, wherein the verification query is generated via the web interface, and transmitting the verification query to the verification exchange server system via the firewall device.

6. The verification exchange computing system of claim 5, wherein the contributor external-facing device is further configured for:
establishing an additional secure HTTP connection with the particular contributor computing system;
providing, to the particular contributor computing system via the additional secure HTTP connection, a reporting interface for accessing a subset of data stored in the consumer-status verification repository that corresponds to data provided by the particular contributor computing system; and
transmitting, responsive to a request received via the additional secure HTTP connection and generated via the reporting interface, the subset of the data.

7. The verification exchange computing system of claim 1, wherein the verification exchange server system is further configured for:
identifying a consumer entity within the standardized employment or income data; and
providing a consumer computing system with access to a portion of the standardized employment or income data stored in the consumer-status verification repository that corresponds to the consumer entity.

8. A method comprising:
in a secured part of a verification exchange computing system:
generating and executing, by a verification server, transformation code, the transformation code comprising a plurality of sections and including at least one operation to convert employment or income data from contributor computing systems to standardized
accessing a contributor-specific mapping between a contributor field of the employment or income data in a standardized format,
wherein generating the transformation code includes:
accessing a contributor-specific mapping between a set of contributor fields of the employment or income data and a standardized field having the standardized format, the contributor-specific mapping identifying a data structure relationship between a set of data values received from a particular contributor computing system and standardized data in the standardized field,
determining a combination function to combine the set of data values into a standardized field, and
generating a contributor-specific section of the transformation code that implements the combination function on the set of data values received from the particular contributor computing system,
wherein executing the transformation code includes combining the set of contributor fields into a target field having the standardized format by computing a new data value from the set of data values;
storing the standardized employment or income data having the standardized format in a consumer-status verification repository;
restricting access to the standardized employment or income data to accessors that are (i) an originating contributor computing system for the employment or income data or (ii) consumers described by the standardized employment or income data;
matching a credential in a verification query to an authorized credential prior to providing a confirmation of employment or income level to a verifier external-facing device, wherein matching the credential restricts access to an employment or income level to accessors that are a requesting verifier computing system having the credential that matches the authorized credential; and in an unsecured part of the verification exchange computing system:

establishing, by a contributor external-facing device, a secure FTP connection for receiving the employment or income data from the particular contributor computing system and transmitting the employment or income data to the verification server via a firewall device; and providing, by the verifier external-facing device, a web interface to the verifier external-facing device via a secure HTTP connection.

9. The method of claim 8, wherein generating the transformation code comprises:

determining, based on a comparison between example data in the standardized field and additional data in the set of contributor fields, a format change between the standardized field and a field of the set of contributor fields; and generating the contributor-specific section of the transformation code that implements the format change.

10. The method of claim 8, wherein generating the transformation code comprises:

determining the combination function to transform the set of contributor fields into the target field based on a comparison between example data in the set of contributor fields and the target field; and generating the contributor-specific section of the transformation code that implements the combination function.

11. The method of claim 10, further comprising:

prior to generating the transformation code:

identifying a change to a structure of data stored in the consumer-status verification repository;

accessing the contributor-specific mapping from (i) the contributor data in the contributor-specific format of the particular contributor computing system to (ii) an example of data having the standardized format, wherein the contributor-specific mapping reflects the change to the structure of data stored in the consumer-status verification repository;

identifying prior employment or income data received prior to the change to the structure of data stored in the consumer-status verification repository;

executing the transformation code to transform the prior employment or income data into an additional standardized employment or income data; and updating the consumer-status verification repository to include the additional standardized employment or income data.

12. The method of claim 8, further comprising, in the unsecured part of the verification exchange computing system:

providing the contributor external-facing device configured for communicating with the verification exchange computing system through a security portal and for communicating with the contributor computing systems via a public data network; and providing the verifier external-facing device, wherein the verifier external-facing device performs additional operations comprising:

receiving the verification query from the requesting verifier computing system via the secure HTTP connection, wherein the verification query is generated via the web interface, and transmitting the verification query to the verification server via the firewall device.

13. The method of claim 12, further comprising:

establishing, by the contributor external-facing device, an additional secure HTTP connection with the particular contributor computing system;

providing, to the particular contributor computing system via the additional secure HTTP connection, a reporting interface for accessing a subset of data stored in the consumer-status verification repository that corresponds to data provided by the particular contributor computing system; and transmitting, by the contributor external-facing device, the subset of the data responsive to a request received via the additional secure HTTP connection and generated via the reporting interface.

14. The method of claim 8, further comprising:

identifying, by the verification server, a consumer entity within the standardized employment or income data; and providing, by the verification server, a consumer computing system with access to a portion of the standardized employment or income data stored in the consumer-status verification repository that corresponds to the consumer entity.

15. A non-transitory computer-readable medium having program code that is executable by a verification exchange computing system to perform operations, the operations comprising:

in a secured part of the verification exchange computing system:

generating and executing, by a verification server, transformation code, the transformation code comprising a plurality of sections and including at least one operation to convert employment or income data from contributor computing systems to standardized employment or income data in a standardized format, wherein generating the transformation code includes:

accessing a contributor-specific mapping between a set of contributor fields of the employment or income data and a standardized field having the standardized format, the contributor-specific mapping identifying a data structure relationship between a set of data values received from a particular contributor computing system and standardized data in the standardized field, determining a combination function to combine the set of data values into the standardized field, and generating a contributor-specific section of the transformation code that implements the combination function on the set of data values received from the particular contributor computing system, wherein executing the transformation code includes combining the set of contributor fields into a target field having the standardized format by computing a new data value from the set of data values;

storing the standardized employment or income data having the standardized format in a consumer-status verification repository;

restricting access to the standardized employment or income data to accessors that are (i) an originating contributor computing system for the employment or income data or (ii) consumers described by the standardized employment or income data;

matching a credential in a verification query to an authorized credential prior to providing a confirmation of employment or income level to a verifier external-facing device, wherein matching the credential restricts access to an employment or income level to accessors that are a requesting verifier computing system having the credential that matches the authorized credential;

establishing, by a contributor external-facing device in an unsecured part of the verification exchange computing system, a secure FTP connection for receiving the employment or income data from the particular contributor computing system and transmitting the employment or income data to the verification server via a firewall device; and providing, by the verifier external-facing device, a web interface to the verifier external-facing device via a secure HTTP connection.

16. The non-transitory computer-readable medium of claim 15, wherein generating the transformation code comprises:

determining, based on a comparison between example data in the standardized field and additional data in the set of contributor fields, a format change between the standardized field and a field of the set of contributor fields; and generating the contributor-specific section of the transformation code that implements the format change.

17. The non-transitory computer-readable medium of claim 15, wherein generating the transformation code comprises:

determining the combination function to transform the set of contributor fields into the target field based on a comparison between example data in the set of contributor fields and the target field; and generating the contributor-specific section of the transformation code that implements the combination function.

18. The non-transitory computer-readable medium of claim 17, the operations further comprising:

prior to generating the transformation code:
identifying a change to a structure of data stored in the consumer-status verification repository;
accessing the contributor-specific mapping from (i) an example of the contributor data in the contributor-specific format of the particular contributor computing system to (ii) an example of data having the standardized format, wherein the contributor-specific mapping reflects the change to the structure of data stored in the consumer-status verification repository;

identifying prior employment or income data received prior to the change to the structure of data stored in the consumer-status verification repository;

executing the transformation code to transform the prior employment or income data into additional standardized employment or income data; and updating the consumer-status verification repository to include the additional standardized employment or income data.

19. The non-transitory computer-readable medium of claim 15, the operations further comprising:

receiving, by the verifier external-facing device, the verification query from the requesting verifier computing system via the secure HTTP connection, wherein the verification query is generated via the web interface; and transmitting, by the verifier external-facing device, the verification query to the verification server via the firewall device.

20. The non-transitory computer-readable medium of claim 19, the operations further comprising:

establishing, by the contributor external-facing device, an additional secure HTTP connection with the particular contributor computing system;

providing, to the particular contributor computing system via the additional secure HTTP connection, a reporting interface for accessing a subset of data stored in the consumer-status verification repository that corresponds to data provided by the particular contributor computing system; and transmitting, by the contributor external-facing device, the subset of the data responsive to a request received via the additional secure HTTP connection and generated via the reporting interface.

* * * * *